US008732323B2

(12) United States Patent
Shimizu et al.

(10) Patent No.: US 8,732,323 B2
(45) Date of Patent: May 20, 2014

(54) RECORDING MEDIUM STORING TRANSACTION MODEL GENERATION SUPPORT PROGRAM, TRANSACTION MODEL GENERATION SUPPORT COMPUTER, AND TRANSACTION MODEL GENERATION SUPPORT METHOD

(75) Inventors: Toshihiro Shimizu, Kawasaki (JP); Nobuhiro Yugami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 495 days.

(21) Appl. No.: 12/630,090

(22) Filed: Dec. 3, 2009

(65) Prior Publication Data
US 2010/0153571 A1 Jun. 17, 2010

(30) Foreign Application Priority Data
Dec. 17, 2008 (JP) ................................. 2008-320628

(51) Int. Cl.
*G06F 15/16* (2006.01)
(52) U.S. Cl.
USPC ........... 709/230; 709/231; 709/232; 709/233; 709/234; 709/235
(58) Field of Classification Search
USPC .................. 709/230, 231, 232, 233, 234, 235
See application file for complete search history.

(56) References Cited

U.S. PATENT DOCUMENTS

| 6,181,687 | B1 * | 1/2001 | Bisdikian | 370/347 |
|---|---|---|---|---|
| 2002/0161823 | A1 * | 10/2002 | Casati et al. | 709/202 |
| 2005/0289231 | A1 | 12/2005 | Harada et al. | |
| 2009/0193485 | A1 * | 7/2009 | Rieger et al. | 725/114 |
| 2011/0252087 | A1 * | 10/2011 | Zuzga et al. | 709/203 |
| 2011/0268172 | A1 * | 11/2011 | Hayashi et al. | 375/229 |
| 2011/0307602 | A1 * | 12/2011 | Kanemasa | 709/224 |

FOREIGN PATENT DOCUMENTS

JP 2006-011683 1/2006

* cited by examiner

*Primary Examiner* — Tammy Nguyen
*Assistant Examiner* — Jonathan Bui
(74) *Attorney, Agent, or Firm* — Fujitsu Patent Center

(57) ABSTRACT

A computer supports generating a model of transactions in which services are processed in multiple layers. The computer refers to start times and end times of processings, which are invoked and generated from another processing in the services, of the same server to calculate time intervals between the processings. The computer generates possible thresholds indicating thresholds that are possible criteria for grouping the processings according to the time intervals between the processings. The computer puts together, for each of the generated possible thresholds, consecutive processings, in which the time intervals between the processings are equal to or smaller than the possible threshold, into the same group to generate a group that the processings belong to. The computer divides a group, among the generated groups, without a processing serving as an invoker into processing-by-processing groups. The computer determines the possible threshold with the least number of groups as the threshold.

14 Claims, 19 Drawing Sheets

FIG. 11

142 EVENT INFORMATION STORAGE UNIT

142a EVENT INFORMATION TABLE

| EVENT ID | START TIME (ms) | END TIME (ms) | TIME INTERVAL (ms) | POSSIBLE THRESHOLD | |
|---|---|---|---|---|---|
| | | | | - | - |
| | | | | GROUP ID | GROUP ID |
| 1 | 1 | 2 | - | - | - |
| 2 | 5 | 6 | - | - | - |
| 3 | 8 | 9 | - | - | - |
| 4 | 15 | 16 | - | - | - |
| 5 | 17 | 18 | - | - | - |
| 6 | 21 | 22 | - | - | - |
| 7 | 28 | 29 | - | - | - |
| 8 | 33 | 34 | - | - | - |
| 9 | 35 | 36 | - | - | - |
| 10 | 40 | 41 | - | - | - |
| 11 | 42 | 44 | - | - | - |
| 12 | 47 | 48 | - | - | - |
| 13 | 60 | 63 | - | - | - |
| 14 | 70 | 71 | - | - | - |
| 15 | 72 | 73 | - | - | - |
| 16 | 80 | 81 | - | - | - |
| 17 | 82 | 84 | - | - | - |
| 18 | 88 | 90 | - | - | - |
| 19 | 100 | 102 | - | - | - |
| 20 | 105 | 106 | - | - | - |
| 21 | 107 | 110 | - | - | - |

FIG. 13

142 EVENT INFORMATION STORAGE UNIT

142a EVENT INFORMATION TABLE

| EVENT ID | START TIME (ms) | END TIME (ms) | TIME INTERVAL (ms) | POSSIBLE THRESHOLD | |
|---|---|---|---|---|---|
| | | | | - | - |
| | | | | GROUP ID | GROUP ID |
| 1 | 1 | 2 | | - | - |
| 2 | 5 | 6 | 3 | - | - |
| 3 | 8 | 9 | 2 | - | - |
| 4 | 15 | 16 | 6 | - | - |
| 5 | 17 | 18 | 1 | - | - |
| 6 | 21 | 22 | 3 | - | - |
| 7 | 28 | 29 | 6 | - | - |
| 8 | 33 | 34 | 4 | - | - |
| 9 | 35 | 36 | 1 | - | - |
| 10 | 40 | 41 | 4 | - | - |
| 11 | 42 | 44 | 1 | - | - |
| 12 | 47 | 48 | 3 | - | - |
| 13 | 60 | 63 | 12 | - | - |
| 14 | 70 | 71 | 7 | - | - |
| 15 | 72 | 73 | 1 | - | - |
| 16 | 80 | 81 | 7 | - | - |
| 17 | 82 | 84 | 1 | - | - |
| 18 | 88 | 90 | 4 | - | - |
| 19 | 100 | 102 | 10 | - | - |
| 20 | 105 | 106 | 3 | - | - |
| 21 | 107 | 110 | 1 | - | - |

FIG. 15

142 EVENT INFORMATION STORAGE UNIT

142a EVENT INFORMATION TABLE

| EVENT ID | START TIME (ms) | END TIME (ms) | TIME INTERVAL (ms) | POSSIBLE THRESHOLD | |
|---|---|---|---|---|---|
| | | | | 5ms | - |
| | | | | GROUP ID | GROUP ID |
| 1 | 1 | 2 | | 1 | - |
| 2 | 5 | 6 | 3 | 1 | - |
| 3 | 8 | 9 | 2 | | - |
| 4 | 15 | 16 | 6 | | - |
| 5 | 17 | 18 | 1 | 2 | - |
| 6 | 21 | 22 | 3 | | - |
| 7 | 28 | 29 | 6 | | - |
| 8 | 33 | 34 | 4 | | - |
| 9 | 35 | 36 | 1 | 3 | - |
| 10 | 40 | 41 | 4 | | - |
| 11 | 42 | 44 | 1 | | - |
| 12 | 47 | 48 | 3 | | - |
| 13 | 60 | 63 | 12 | 4 | - |
| 14 | 70 | 71 | 7 | 5 | - |
| 15 | 72 | 73 | 1 | | - |
| 16 | 80 | 81 | 7 | | - |
| 17 | 82 | 84 | 1 | 6 | - |
| 18 | 88 | 90 | 4 | | - |
| 19 | 100 | 102 | 10 | | - |
| 20 | 105 | 106 | 3 | 7 | - |
| 21 | 107 | 110 | 1 | | - |

GROUP INFORMATION TABLE 142b

| POSSIBLE THRESHOLD: 5ms | | |
|---|---|---|
| GROUP ID | START TIME | END TIME |
| 1 | 1 | 9 |
| 2 | 15 | 22 |
| 3 | 28 | 48 |
| 4 | 60 | 63 |
| 5 | 70 | 73 |
| 6 | 80 | 90 |
| 7 | 100 | 110 |

FIG. 16

142 EVENT INFORMATION STORAGE UNIT

142a EVENT INFORMATION TABLE

| EVENT ID | START TIME (ms) | END TIME (ms) | TIME INTERVAL (ms) | POSSIBLE THRESHOLD 5ms GROUP ID | POSSIBLE THRESHOLD 2.5ms GROUP ID | POSSIBLE THRESHOLD - GROUP ID |
|---|---|---|---|---|---|---|
| 1 | 1 | 2 |  | 1 | 1 | - |
| 2 | 5 | 6 | 3 | 1 | 2 | - |
| 3 | 8 | 9 | 2 | 1 | 2 | - |
| 4 | 15 | 16 | 6 | 2 | 3 | - |
| 5 | 17 | 18 | 1 | 2 | 3 | - |
| 6 | 21 | 22 | 3 | 2 | 4 | - |
| 7 | 28 | 29 | 6 | 3 | 5 | - |
| 8 | 33 | 34 | 4 | 3 | 6 | - |
| 9 | 35 | 36 | 1 | 3 | 6 | - |
| 10 | 40 | 41 | 4 | 3 | 7 | - |
| 11 | 42 | 44 | 1 | 3 | 7 | - |
| 12 | 47 | 48 | 3 | 3 | 8 | - |
| 13 | 60 | 63 | 12 | 4 | 9 | - |
| 14 | 70 | 71 | 7 | 5 | 10 | - |
| 15 | 72 | 73 | 1 | 5 | 10 | - |
| 16 | 80 | 81 | 7 | 6 | 11 | - |
| 17 | 82 | 84 | 1 | 6 | 11 | - |
| 18 | 88 | 90 | 4 | 6 | 12 | - |
| 19 | 100 | 102 | 10 | 7 | 13 | - |
| 20 | 105 | 106 | 3 | 7 | 14 | - |
| 21 | 107 | 110 | 1 | 7 | 14 | - |

142c EVENT INFORMATION TABLE

POSSIBLE THRESHOLD: 2.5ms

| GROUP ID | START TIME | END TIME |
|---|---|---|
| 1 | 1 | 2 |
| 2 | 5 | 9 |
| 3 | 15 | 18 |
| 4 | 21 | 22 |
| 5 | 28 | 29 |
| 6 | 33 | 36 |
| 7 | 40 | 44 |
| 8 | 47 | 48 |
| 9 | 60 | 63 |
| 10 | 70 | 73 |
| 11 | 80 | 84 |
| 12 | 88 | 90 |
| 13 | 100 | 102 |
| 14 | 107 | 110 |

FIG. 18
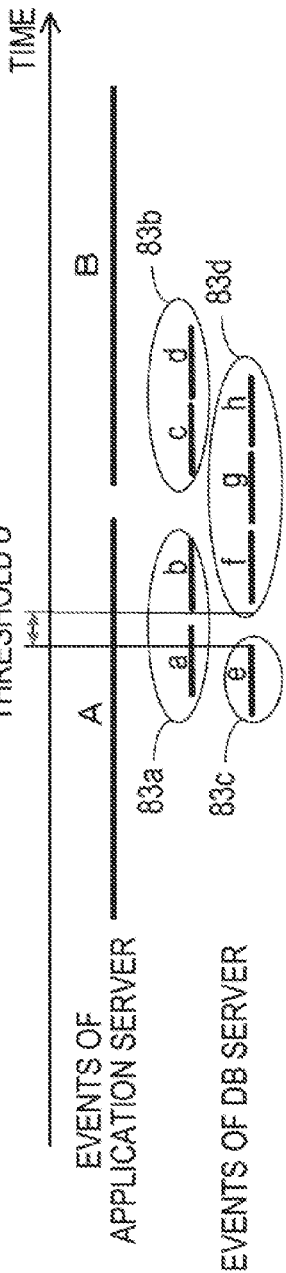
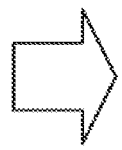
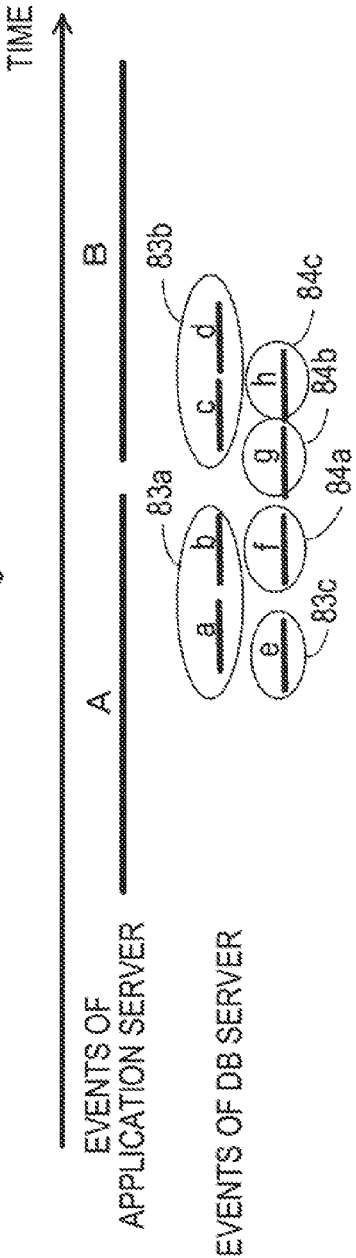

RECORDING MEDIUM STORING TRANSACTION MODEL GENERATION SUPPORT PROGRAM, TRANSACTION MODEL GENERATION SUPPORT COMPUTER, AND TRANSACTION MODEL GENERATION SUPPORT METHOD

CROSS-REFERENCE TO RELATED APPLICATIONS

This application is based upon and claims the benefit of priority of the prior Japanese Patent Application No. 2008-320628, filed on Dec. 17, 2008, the entire contents of which are incorporated herein by reference.

FIELD

Various embodiments described herein relate to a technique for generating a model of transactions in which services are processed in multiple layers.

BACKGROUND

A multiplicity of Web pages can be browsed through the Internet due to the widespread use of the Internet. Information providing services of Web pages, etc., through the Internet are generally provided by a system called a Web 3-layer model. In the Web 3-layer model, a Web server that has received a request from a client apparatus invokes application software (hereinafter, simply "application"). The application invoked by the Web server invokes database management software (hereinafter, simply "database"). In this case, separate computers operate the Web server, the application, and the database in many cases.

In such a Web 3-layer model, it is not easy to survey the cause when there is a problem in performance, etc. One of the causes of the difficulty is that the software is dispersed into individual computers for operation. The problem is made more difficult because different developers make the software, and analyzing inside the processing of the software to search for the cause is virtually impossible.

To address such a problem, a system is proposed in which a message streaming on the network is observed to measure the required time in the Web server, the application, and the database for transactions. In such a system, the analyzing apparatus observes the network, and on the basis of the observed messages, generates a model (transaction model) of an invocation relationship between events.

The event denotes a processing unit executed according to a request from a client or another server. The event ends after a response is returned to the sender of the request. Therefore, the start times and the end times of individual events can be recognized by extracting request messages and reply messages through the network. The invocation relationship between events is determined by the inclusion relation of the time zones of events executed by the invoker, the IP (Internet Protocol) address of the computer that executes the events of the invoker, and the IP address of the computer of the call target.

After generating a transaction model, the analyzing apparatus compares the observed messages and the transaction model to determine the generated transactions.

In this way, generating the transaction model in advance allows the classification of transactions executed through the network in operation. On the basis of the generation times of the messages included in the classified transactions, the processing time by each server can be calculated for each processing of the transactions.

To generate a transaction model, a plurality of consecutive events can be considered as a series of processings, and the processings can be put together to generate a transaction model. If a plurality of consecutive events are put together, events in which only the numbers of accesses to the database are different, such as account activity inquiries of bank account, can be considered identical. As a result, a searching processing of a transaction model that matches the content of a message streaming on the network can be made more efficient. Upon calculating the processing time of each server for each type of transaction, the transactions of the same type, in which only the numbers of data accesses are different, can be analyzed as one unity. The processing of treating an assembly of consecutive events as a series of processings and generating a group including the events is called grouping. The group generated in the grouping is determined as a processing within one transaction, and a transaction model including the group is generated.

An example of methods for determining whether to group a plurality of consecutive events when there are a plurality of events includes a method of comparing time intervals between events and a predetermined threshold. In the method, events continuously generated at time intervals within the threshold are determined as consecutive processings within one transaction, and the events are grouped. The reason that the group can be appropriately generated using the threshold is that it can be assumed that the time intervals between events of a series of processings within one transaction are sufficiently shorter than the time intervals between applications of another transaction.

However, an appropriate value of the threshold of the time intervals for grouping is not self-evident. If the set threshold is too short, an individual transaction model is generated from each of a plurality of transactions that should be grouped and belong to one transaction model. If the set threshold is too long, a plurality of events that should not be grouped are grouped, and a correct transaction model cannot be generated. Thus, some values are actually set as thresholds to attempt generating transaction models, and the threshold to be used subsequently is determined on the basis of the suitability of the generated transaction models. However, the attempt to generate such a transaction model requires much effort.

The disclosed technique has been made in view of the foregoing circumstances, and an object is to provide a technique that can automatically determine an appropriate threshold of time intervals used for the determination of grouping.

SUMMARY

A computer supports generating a model of transactions in which services are processed in multiple layers. A time interval calculating unit refers to a processing time information storage unit that stores start times and end times of processings, which are invoked and generated from another processing in the services, of the same server to calculate time intervals between the processings. A possible threshold generating unit generates a plurality of possible thresholds indicating thresholds that are possible criteria for grouping the processings according to the time intervals between the processings. A group generating unit puts together, for each of the generated possible thresholds, consecutive processings, in which the time intervals between the processings are equal to or smaller than the possible threshold, into the same group to generate a group that the processings belong to. A group dividing unit divides a group, among the generated groups, without a processing serving as an invoker into processing-by-processing groups. A threshold determining unit determines the possible threshold with the least number of groups as the threshold.

Additional aspects and/or advantages will be set forth in part in the description which follows and, in part, will be apparent from the description, or may be learned by practice of the various embodiments.

BRIEF DESCRIPTION OF DRAWINGS

FIG. 11 illustrates a data configuration example of an event information table;

FIG. 13 illustrates the event information table after time interval setting;

FIG. 15 illustrates a group generation example with a possible threshold "5 ms";

FIG. 16 illustrates a group generation example with a possible threshold "2 ms";

FIG. 18 illustrates a second example of the group division processing; and

DESCRIPTION OF EMBODIMENTS

The present embodiment will now be described with reference to the drawings.

Figure 1:
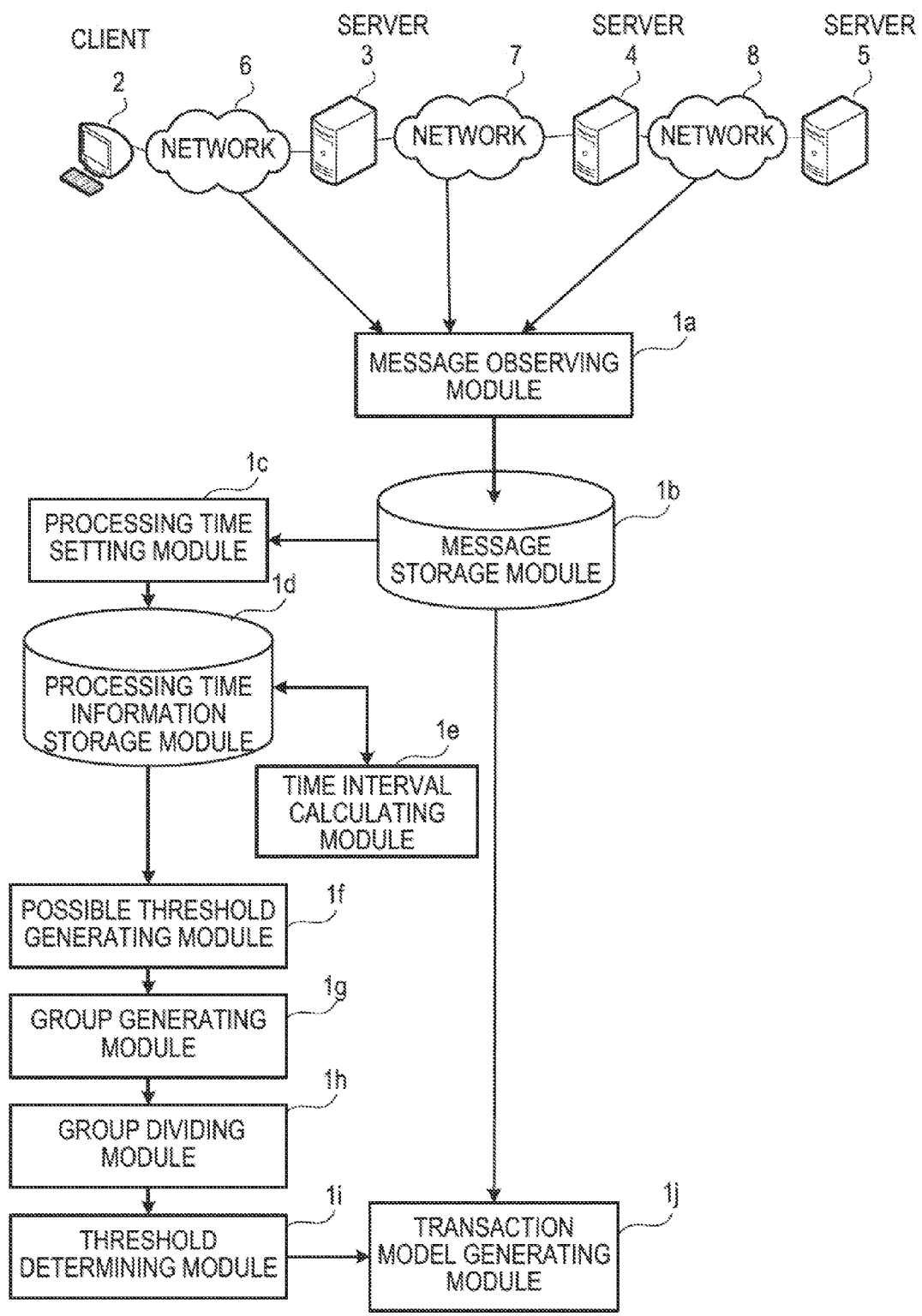
FIG. 1 illustrates an outline of an embodiment.

FIG. 1 illustrates an outline of the embodiment. In the present embodiment, a request from a client 2 is inputted to a server 3 through a network 6. The server 3 works with a server 4 connected through a network 7 and a server 5 further connected to the server 4 through a network 8 to provide a service for executing a requested processing to the client 2. A system for performing such a service through the WWW (World Wide Web) is called a Web 3-layer model. Transaction models are generated according to the contents of transactions executed by the system made up of the multi-layered servers 3 to 5. When similar processings are continuously executed, grouping is performed to put the processings together. Whether to put the consecutive processings together into the same group or not is determined by whether the time intervals of the consecutive processings are within a preset threshold.

The present embodiment provides functions illustrated in FIG. 1 to determine an appropriate value of the threshold for grouping. More specifically, a message observing module 1a, a message storage module 1b, a processing time setting module 1c, a processing time information storage module 1d, a time interval calculating module 1e, a possible threshold generating module 1f, a group generating module 1g, a group dividing module 1h, a threshold determining module 1i, and a transaction model generating module 1j are provided.

The message observing module 1a acquires messages transmitted and received to and from the plurality of servers 3 to 5 from the networks 6 to 8, to which the plurality of server 3 to 5 that provide services are connected, and attaches acquisition times to the acquired messages and stores the messages in the message storage module 1b.

The processing time setting module 1c refers to the message storage module 1b to determine the processings executed by the servers on the basis of the pairs of a request message and a reply message. On the basis of the determination, the processing time setting module 1c sets the acquisition times of the request messages as the start times of the processings and sets the acquisition times of the reply messages as the end times of the processings. The processing time setting module 1c then stores the start times and the end times of the processings in the processing time information storage module 1d.

The time interval calculating module 1e refers to the processing time information storage module 1d that stores the start times and the end times of processings invoked and generated from another processing in the service within the same server, to calculate the time intervals between the processings. The time interval calculating module 1e registers the time intervals between processing and last processing in the processing time information storage module 1d.

The possible threshold generating module 1f generates a plurality of possible thresholds that can be a threshold which serves as a criterion in grouping the processings according to the time intervals between processings.

For each possible threshold generated by the possible threshold generating module 1f, the group generating module 1g puts together consecutive processings, in which the time intervals between processings are equal to or smaller than the possible threshold, and generates groups that the processings belong to.

Among the groups generated by the group generating module 1g, the group dividing module 1h determines a group without a processing as an invoker to be the threshold for dividing the group into processing-by-processing groups.

The transaction model generating module 1j puts together consecutive processings executed at time intervals equal to or smaller than the threshold determined by the threshold determining module 1i into one group to generate a transaction model.

Upon the generation of a transaction model, the servers 3 to 5 start providing services to the client 2. The client 2 causes the servers 3 to 5 to process the request. Consequently, the message observing module 1a acquires a message transmitted and received to and from the servers 3 to 5. The acquisition time is attached to the acquired message, and the message is stored in the message storage module 1b.

The processing time setting module 1c then determines processings executed by the servers on the basis of the pairs of a request message and a response message. The processing time setting module 1c stores the start times and the end times of the processings in the processing time information storage module 1d. Consequently, the time interval calculating module 1e calculates the time intervals between processings invoked and generated from another processing in the service within the same server.

The possible threshold generating module 1f then generates a plurality of possible thresholds that represent threshold candidates. For each possible threshold, the group generating module 1g puts together consecutive processings, in which time intervals between processings are equal to or smaller than the possible threshold, into the same group. In this case, among the groups generated by the group generating module 1g, the groups in which a processing as invoker doesn't exist are divided into groups at each processing by the group dividing module 1h.

The threshold determining module 1i then determines the possible threshold with the least number of groups as the threshold of the time intervals. On the basis of the determined threshold, the transaction model generating module 1j puts together consecutive processings executed at time intervals equal to or smaller than the threshold into one group to generate a transaction model.

In this way, an appropriate threshold is automatically determined, and a generation processing of a transaction model accompanied by grouping is executed on the basis of the threshold. Moreover, an appropriate threshold is determined without attempting to generate a transaction model. Upon the generation of a transaction model, the consistency of the invocation relationship between the servers 3 and 4 and the consistency of the invocation relationship between the servers 4 and 5 are maintained to generate a transaction model. Thus, the consistency of the invocation relationship between the servers 3 and 4 is taken into consideration to generate a transaction model.

Meanwhile, whether or not a processing selectable as an invoker of a generated group exists in the server 4 is checked to determine the threshold for grouping the processings executed by the server 5 with the method illustrated in FIG. 1. Thus, the invocation relationship between the servers 4 and 5 is taken into consideration. Therefore, less determination factors are required to determine the threshold, and the threshold is determined in a shorter time compared to when a transaction model is generated to determine the threshold.

Upon the generation of possible thresholds, it is possible to generate a multiplicity of possible thresholds from the beginning and execute the group generation processing and the group division processing for all possible thresholds. However, to find out a more appropriate threshold, it is desirable to shorten the intervals for generating the possible thresholds and count the numbers of groups at the time the grouping is performed on the basis of the possible thresholds. For example, the times obtained by dividing a specific search section by several milliseconds are set as possible thresholds. If possible thresholds generated with such small intervals are generated for all imaginable search sections, the number of possible thresholds is enormous. Therefore, in the present embodiment, possible thresholds are first generated at wide intervals, and the search section is gradually narrowed down to possible thresholds with fewer groups. As the search section is narrowed down, the intervals of times for generating possible thresholds are also gradually narrowed down. This reduces the number of possible thresholds generated before the determination of the threshold.

The present embodiment will now be described in detail by illustrating an example, in which the search section of thresholds is gradually narrowed down to reduce the processing load required to determine the threshold. In the following description, a processing unit executed in the servers will be called an "event."

Figure 2:
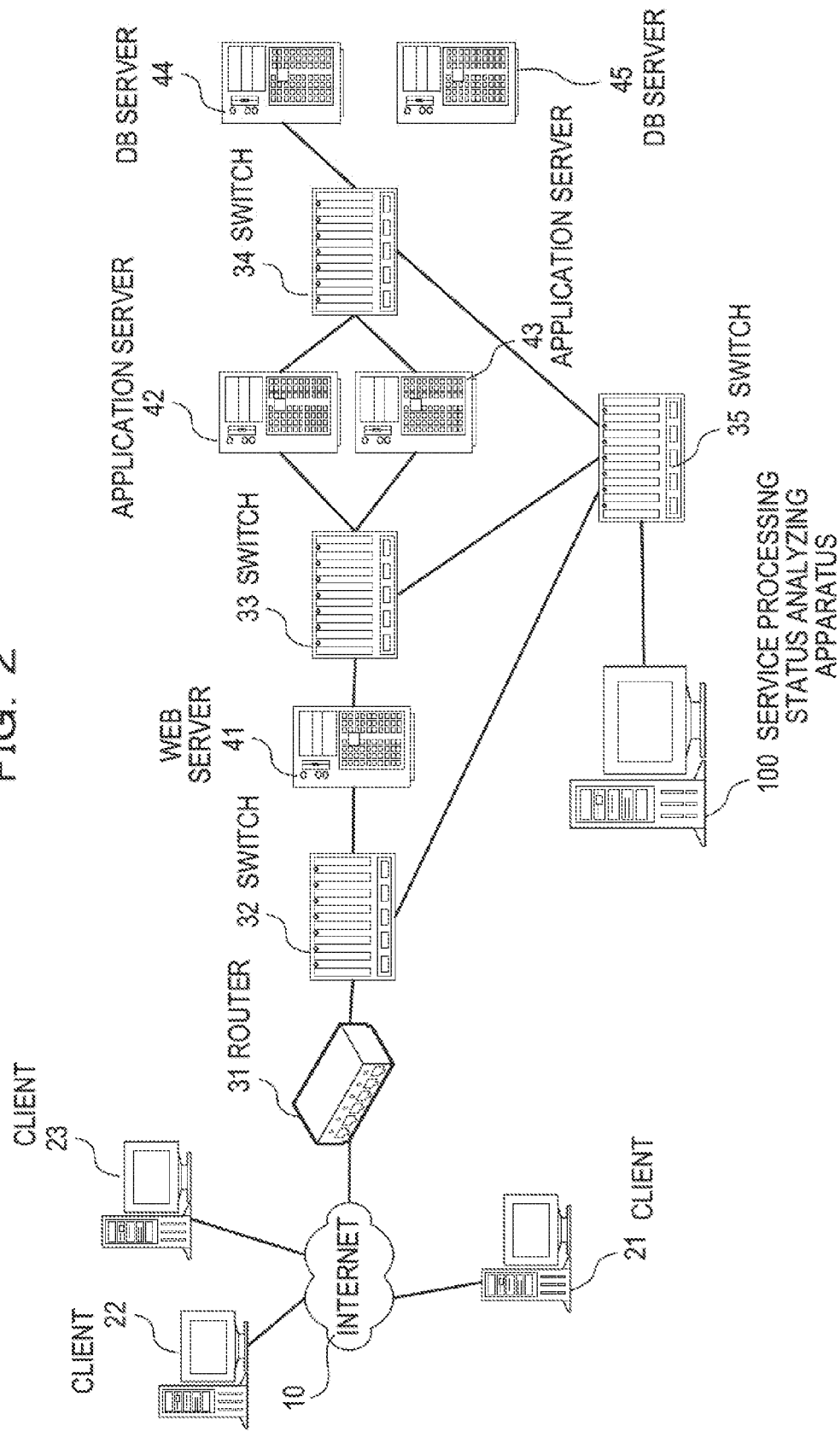
FIG. 2 illustrates a system configuration example of the present embodiment.

FIG. 2 illustrates a system configuration example of the present embodiment. As illustrated in FIG. 2, a plurality of clients 21 to 23 are connected to the Internet 10. A router 31 is also connected to the Internet 10. In FIG. 2, the router 31 and the devices on the right side of the router 31 make up a network system of a service provider. The network system of the service provider has a 3-layer configuration of a Web server 41, application servers 42 and 43, and database (DB) servers 44 and 45.

The Web server 41 is connected to the router 31 through a switch 32. The Web server 41 provides information to the clients 21 to 23 through the WWW (World Wide Web). The application servers 42 and 43 are connected to the Web server 41 through a switch 33. The application servers 42 and 43 execute data processing in response to a request from the Web server 41. The DB servers 44 and 45 are connected to the application servers 42 and 43 through a switch 34. The DB servers 44 and 45 input and output data to and from databases in response to requests from the application servers 42 and 43.

Each of the switches 32 to 34 includes a port monitoring function. The port monitoring function is a function for transmitting a copy of a packet transmitted and received through the ports of the switches 32 to 34 to a port designated in advance. Through the switch 35, a service processing status analyzing apparatus 100 is connected to the ports for transmitting the copied packets of the switches 32 to 34.

The service processing status analyzing apparatus 100 analyzes the contents of the packets transmitted and received in the network of the service provider and detects transactions processed in a plurality of servers. The service processing status analyzing apparatus 100 then analyzes the times required by the servers to execute the detected transactions.

Figure 3:
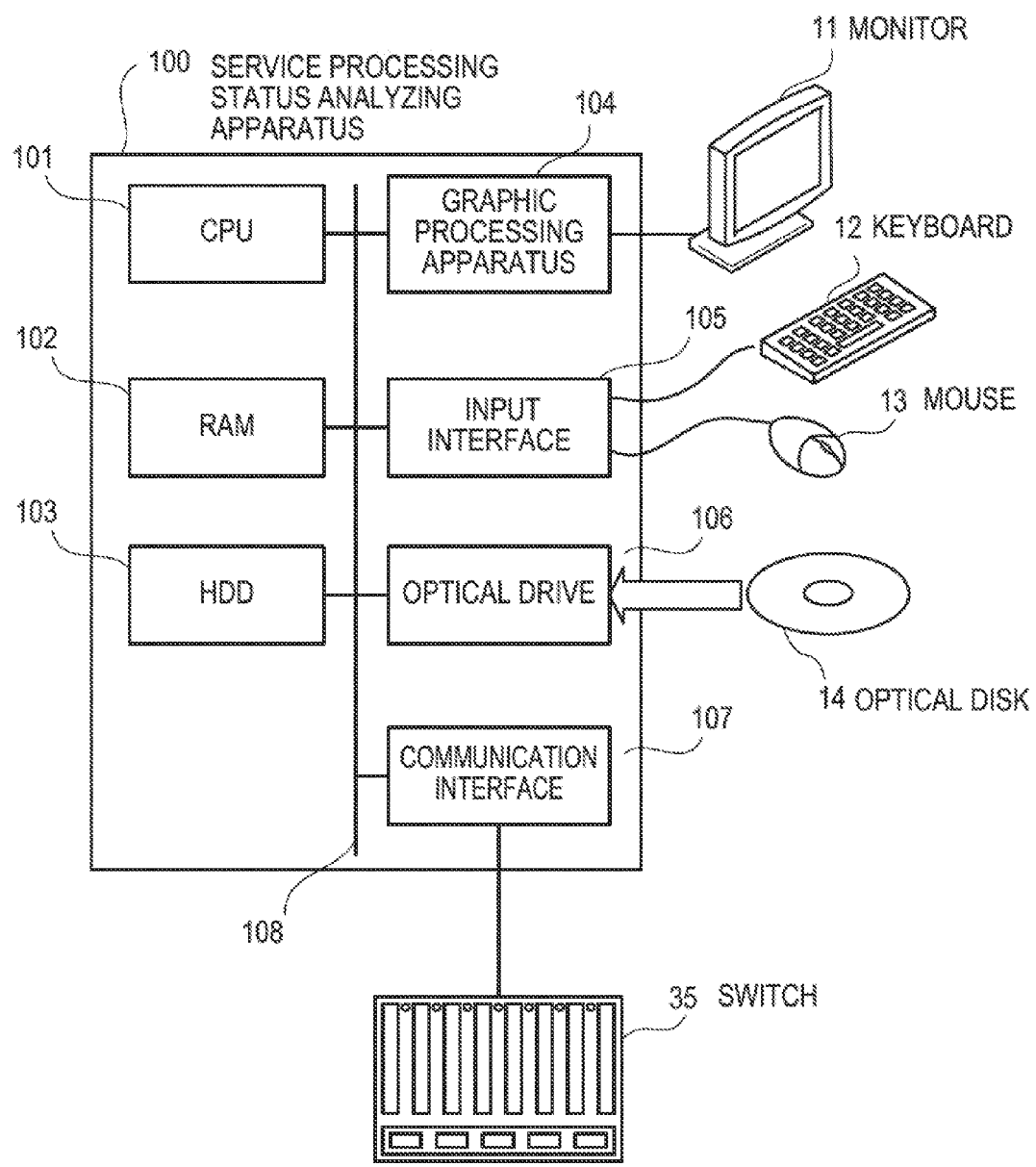
FIG. 3 illustrates a hardware configuration example of a service processing status analyzing apparatus used in the present embodiment.

FIG. 3 illustrates a hardware configuration example of a service processing status analyzing apparatus used in the present embodiment. A CPU (Central Processing Unit) 101 controls the entire apparatus of the service processing status analyzing apparatus 100. A RAM (Random Access Memory) 102, a hard disk drive (HDD: Hard Disk Drive) 103, a graphic processing apparatus 104, an input interface 105, an optical drive 106, and a communication interface 107 are connected to the CPU 101 through a bus 108.

The RAM 102 is used as a main storage device of the service processing status analyzing apparatus 100. The RAM 102 temporarily stores at least some OS (Operating System) programs or application programs for the CPU 101 to execute. The RAM 102 stores various data required for the processings by the CPU 101.

The HDD 103 magnetically writes and reads data to and from a built-in disk. The HDD 103 is used as a secondary storage device of the service processing status analyzing apparatus 100. The HDD 103 stores OS programs, application programs, and various data. A semiconductor storage device such as a flash memory is also used as the secondary storage device.

A monitor 11 is connected to the graphic processing apparatus 104. The graphic processing apparatus 104 displays images on the screen of the monitor 11 according to a command from the CPU 101. Examples of the monitor 11 include a display with a CRT (Cathode Ray Tube) and a liquid crystal display.

A keyboard 12 and a mouse 13 are connected to the input interface 105. The input interface 105 transmits signals transmitted from the keyboard 12 and/or the mouse 13 to the CPU 101. The mouse 13 is just an example of a pointing device, and other point devices are also used. Examples of other point devices include a touch panel, a tablet, a touch pad, and a trackball.

The optical drive 106 uses laser light, etc., to read data recorded in an optical disk 14. The optical disk 14 is a portable recording medium recording data readable by reflection of light. Examples of the optical disk 14 include a DVD (Digital Versatile Disc), a DVD-RAM, a CD-ROM (Compact Disc Read Only Memory), and a CD-R (Recordable)/RW (Re-Writable).

The communication interface 107 is connected to the switch 35. Through the switch 35, the communication interface 107 acquires (captures) packets transmitted and received to and from the router 31, the Web server 41, the application servers 42 and 43, and the DB servers 44 and 45.

Processing functions of the present embodiment are realized by the hardware configuration. Although the hardware configuration of the service processing status analyzing apparatus 100 has been illustrated in FIG. 3, the clients 21 to 23, the Web server 41, the application servers 42 and 43, and the DB server 44 are also realized by similar hardware configurations.

Figure 4:
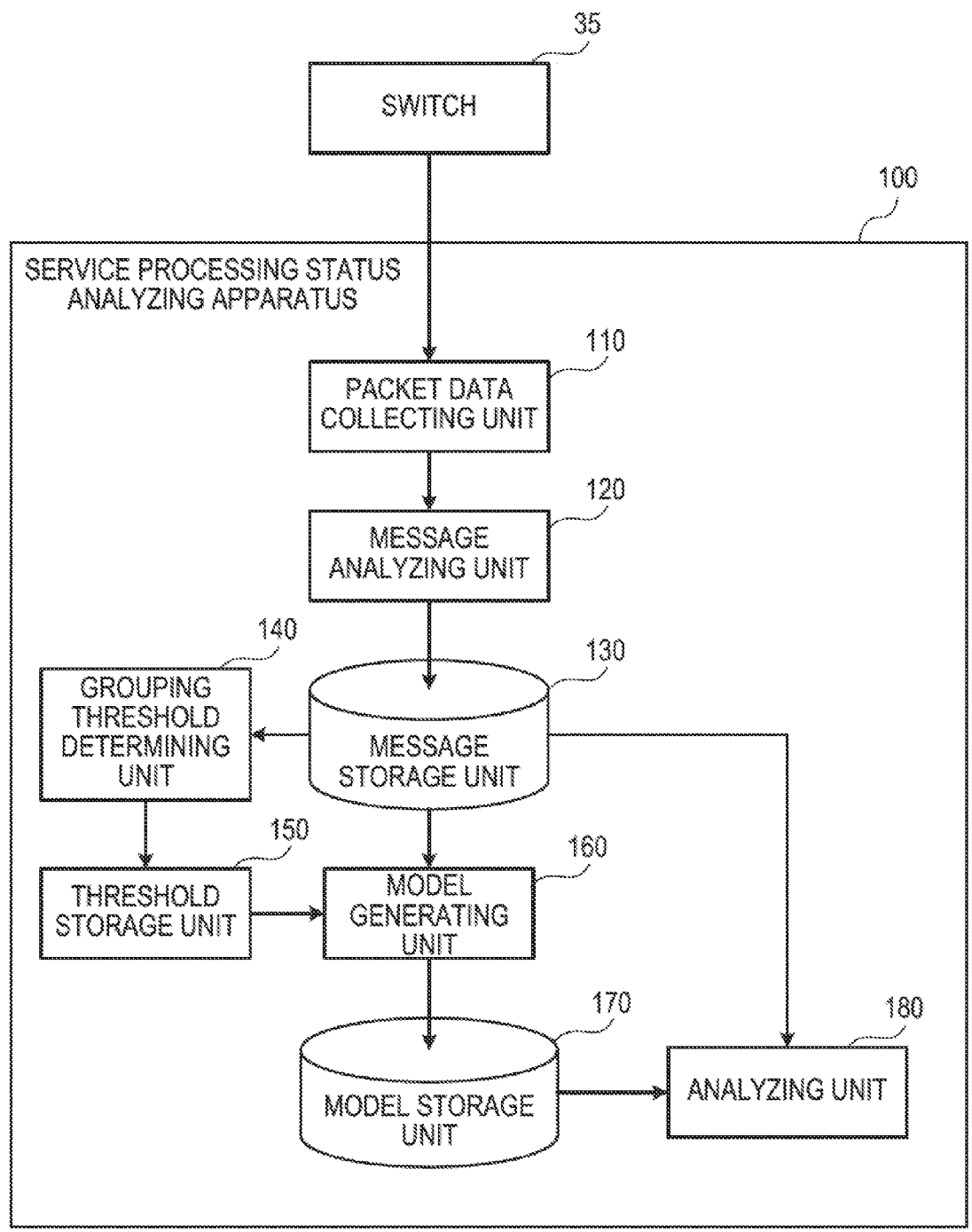
FIG. 4 is a block diagram of functions of the service processing status analyzing apparatus.

FIG. 4 is a block diagram of functions of a service processing status analyzing apparatus. The service processing status analyzing apparatus 100 includes a packet data collecting unit 110, a message analyzing unit 120, a message storage unit 130, a grouping threshold determining unit 140, a threshold storage unit 150, a model generating unit 160, a model storage unit 170, and an analyzing unit 180.

The packet data collecting unit 110 acquires packets transmitted and received through the switch 35 and sends the acquired packets to the message analyzing unit 120.

The message analyzing unit 120 analyzes the contents of the packets sent from the packet data collecting unit 110 and detects messages made up of one or more packets. The message analyzing unit 120 then stores message data indicating the detected messages in the message storage unit 130.

The message storage unit 130 is a storage function for storing message data. For example, a part of the storage area of the RAM 102 is used as the message storage unit 130.

The grouping threshold determining unit 140 refers to the messages in the message storage unit 130 and determines the threshold of time intervals used to determine the necessity of event grouping upon the generation of a transaction model. The grouping threshold determining unit 140 stores the determined threshold in the threshold storage unit 150.

The threshold storage unit 150 stores the threshold of time intervals for grouping determined by the grouping threshold determining unit 140. For example, part of the storage area of the RAM 102 is used as the threshold storage unit 150.

The model generating unit 160 generates a transaction model on the basis of the messages stored in the message storage unit 130. In that case, the model generating unit 160 determines that events continuously executed at time intervals equal to or smaller than the threshold stored in the threshold storage unit 150 as a series of processings within the same transaction and groups the events. The model generating unit 160 stores the generated transaction model in the model storage unit 170.

The model storage unit 170 stores a transaction model indicating a combination of messages included in a transaction. For example, part of the storage area of the HDD 103 is used as the model storage unit 170. The transaction model is set for each type of request outputted from the clients.

After the transaction model is generated, the analyzing unit 180 analyzes the processing time, etc., with the servers in the transactions on the basis of the messages stored in the message storage unit 130. The analyzing unit 180 then displays the analysis result on the monitor 11 by a graph, etc.

The service processing status analyzing apparatus 100 with such a configuration executes the following system analyzing processing.

Figure 5:
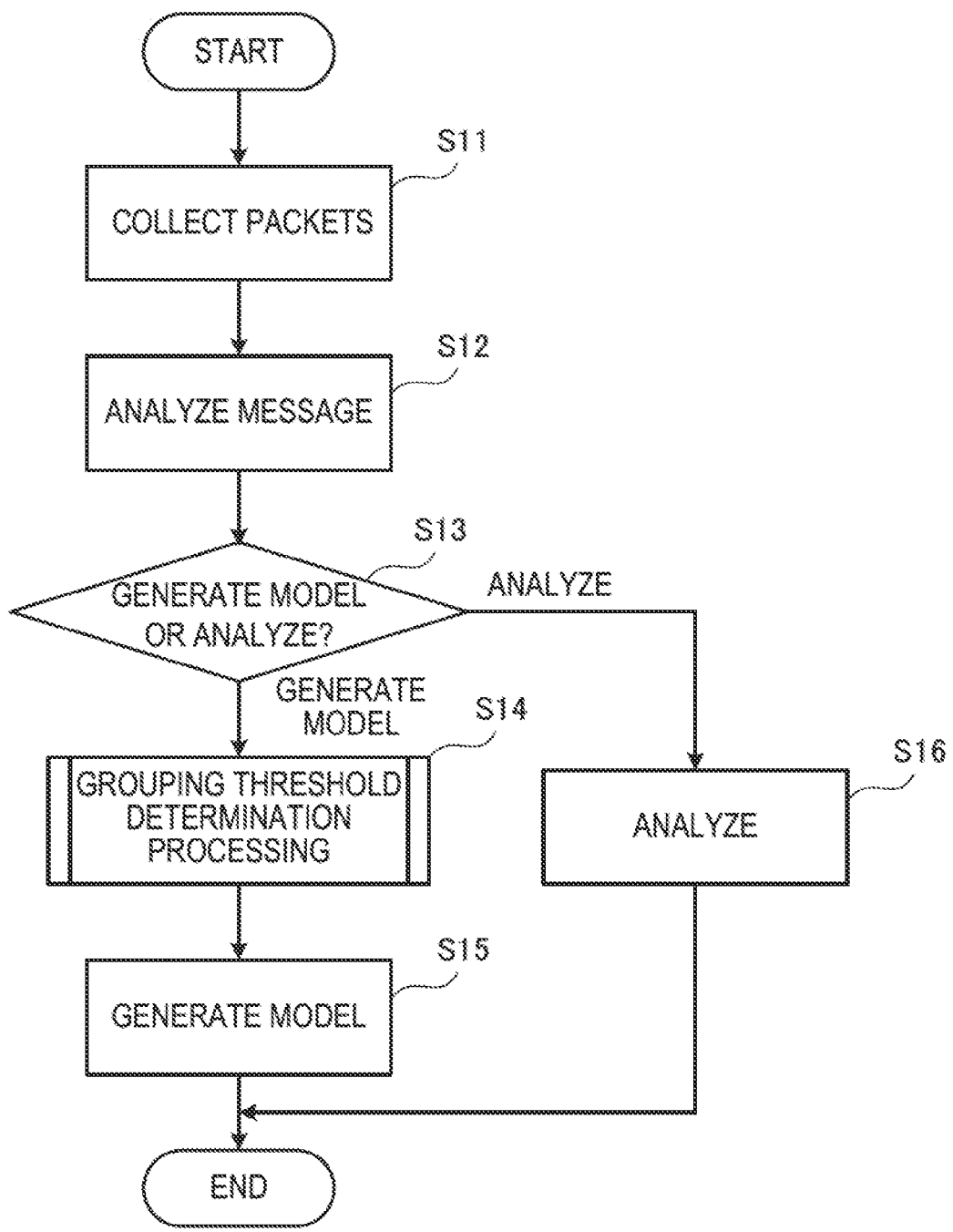
FIG. 5 is a flow chart of a procedure of a service processing status analyzing processing.

FIG. 5 is a flow chart of a procedure of a service processing status analyzing processing. The processing illustrated in FIG. 5 will be described in order.

[S11] Through the switch 35, the packet data collecting unit 110 collects packets transmitted and received to and from the router 31, the Web server 41, the application servers 42 and 43, and the DB servers 44 and 45.

[S12] The message analyzing unit 120 analyzes the packets collected by the packet data collecting unit 110 and generates message data.

The message analyzing unit 120 stores the generated message data in the message storage unit 130.

[S13] The model generating unit 160 determines whether a model generation instruction is inputted. The analyzing unit 180 determines whether an analysis instruction is inputted. For example, an administrator of the service processing status analyzing apparatus 100 uses and operates the keyboard 12, etc., to input and provide the model generation instruction and the analysis instruction. If the model generation instruction is inputted, the processing proceeds to step S14. If the analysis instruction is inputted, the processing proceeds to step S16.

[S14] If the model generation instruction is inputted, the grouping threshold determining unit 140 determines the threshold of time intervals for grouping the transaction models. The determined threshold is sent to the model generating unit 160.

[S15] The model generating unit 160 refers to the messages stored in the message storage unit 130 to generate a transaction model. In that case, the model generating unit 160 executes a grouping processing of events continued at time intervals equal to or smaller than the threshold determined by the grouping threshold determining unit 140. The model generating unit 160 stores the generated transaction model in the model storage unit 170. The processing then ends.

[S16] If the analysis instruction is inputted, the analyzing unit 180 refers to the transaction models stored in a model storage unit 113 and information stored in a protocol log storage unit 112 to analyze information related to the transaction in execution. The processing then ends.

In this way, packets are collected to generate a transaction model, or the transaction is analyzed on the basis of the transaction model.

Figure 6:
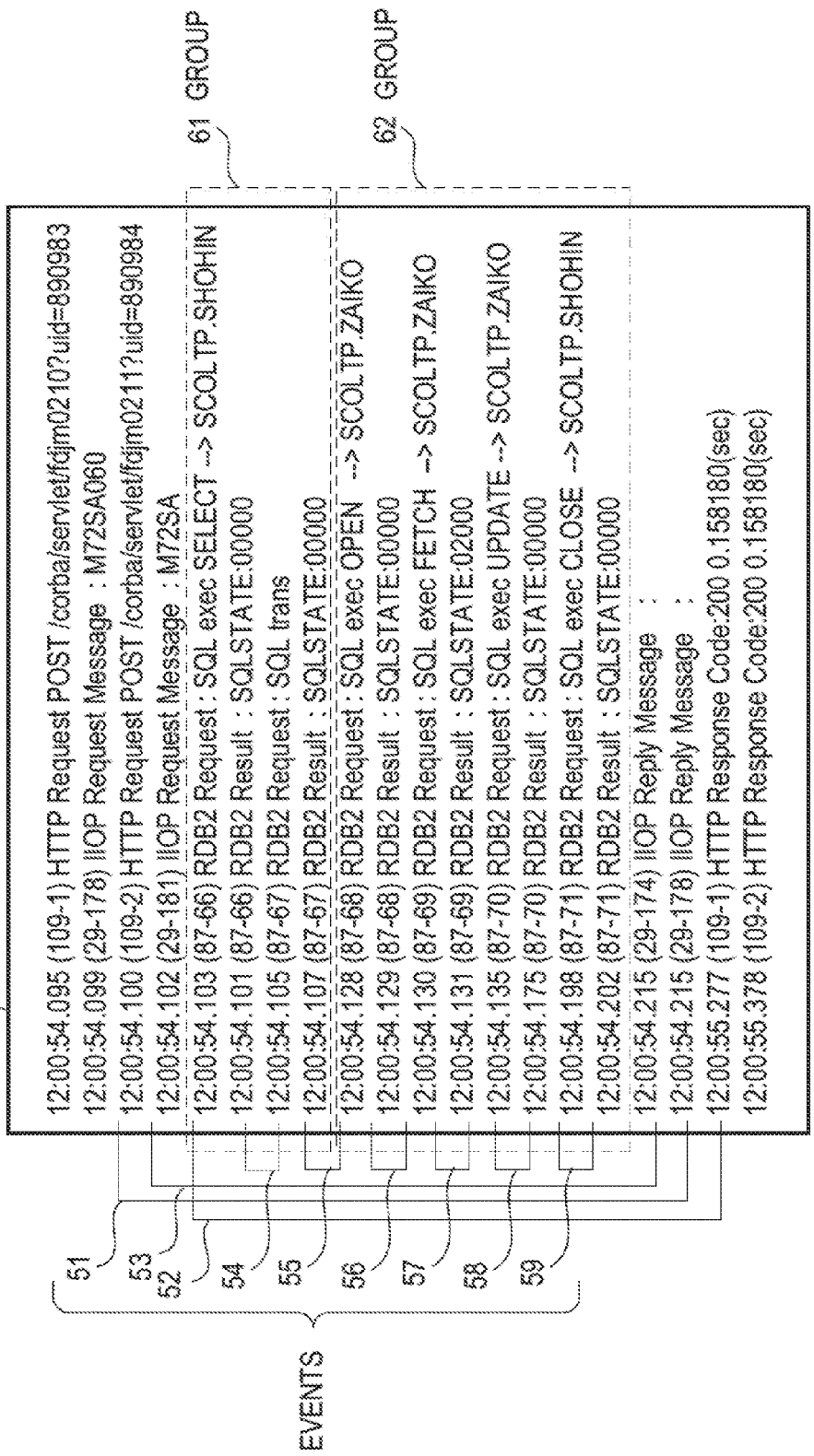
FIG. 6 illustrates a message sequence in a message storage unit.

FIG. 6 illustrates a message sequence in a message storage unit. The message storage unit 130 stores a plurality of message data lines generated from the captured packets in chronological order.

A time stamp indicating the time is at the top of the message data. The time stamps are provided to the acquired packets when the packet data collecting unit 110 acquires the packets. The message analyzing unit 120 provides the time stamps, which are provided to the packets from which the message data is generated, to the generated message data and stores the message data in the message storage unit 130.

A session number is provided after the time stamp in the message data. The same session number is set to the request message and the reply message. Of the two message data lines with the same session number, the message data line with the earlier time stamp indicates the request message. The message data line with the later time stamp indicates the reply message.

A protocol name is set after the session number in the message data. In the example of FIG. 6, values such as "HTTP", "IIOP", and "RDB2" are set as the protocol names.

The message contents are set after the protocol name in the message data.

Events 51 to 59 are grouped on the basis of the message data, and then a transaction model is generated. In the grouping, a request message indicating the start of an event is first extracted from the message data. A reply message with the same session number as the request message is then extracted. The request message and the reply message with a common session number indicate the start time and the end time of an event.

FIG. 6 illustrates two HTTP events 51 and 52, one IIOP event 53, and six DB access processing events 54 to 59. The DB access processing events 54 to 59 will be focused on here. A case of applying a grouping processing to the events 54 to 59 will be considered, in which the threshold is a time interval of 0.02 second (20 ms).

The events 54 to 59 are continuously executed. The time interval from the end time of the event 54 to the start time of the event 55 is 0.004 second (4 ms), which is a short time interval. It is estimated that the DB access events 54 and 55 continuously generated at such a short time interval are invoked from the same IIOP event 53. Thus, one group 61 is generated from two events 54 and 55.

The longest time interval of the consecutive events 56 to 59 is between the events 58 and 59. The time interval between the events 58 and 59 is 0.023 seconds. Therefore, one group 62 is generated from the events 56 to 59.

Meanwhile, the time interval between the events 55 and 56 is 0.021 second (21 ms). Therefore, the events 55 and 56 are determined to be in different groups. As a result, two groups 61 and 62 are generated by the grouping processing in the example of FIG. 6.

Grouping this way allows generalization of transaction models. The generalization of transaction models herein denotes that the generated transaction models are applied to transactions with substantially the same processings of individual events but with different numbers of event generations.

For example, the event 57 in the group 62 is a processing of fetching (FETCH) data from the DB. The event 58 is a processing of updating (UPDATE) data in the DB. Thus, the model generating unit 160 defines that events similar to the events 57 and 58 in the group 62 are repeated a plurality of times upon the generation of the transaction models. In this way, one transaction model is generated from a plurality of transactions in which only the number of data accesses are different. As a result, generation of unnecessary transaction models is reduced if not prevented, and the processing load for searching the transaction models during message analysis is reduced. Furthermore, the analyzing unit 180 puts together a plurality of transactions, in which only the number of updates to the database are different, as the same type of transactions during the message analysis, and the accuracy of the analysis result increases.

Hereinafter, differences in generated transaction models between when grouping is not performed and when grouping is performed will be illustrated in FIGS. 7 and 8.

Figure 7:
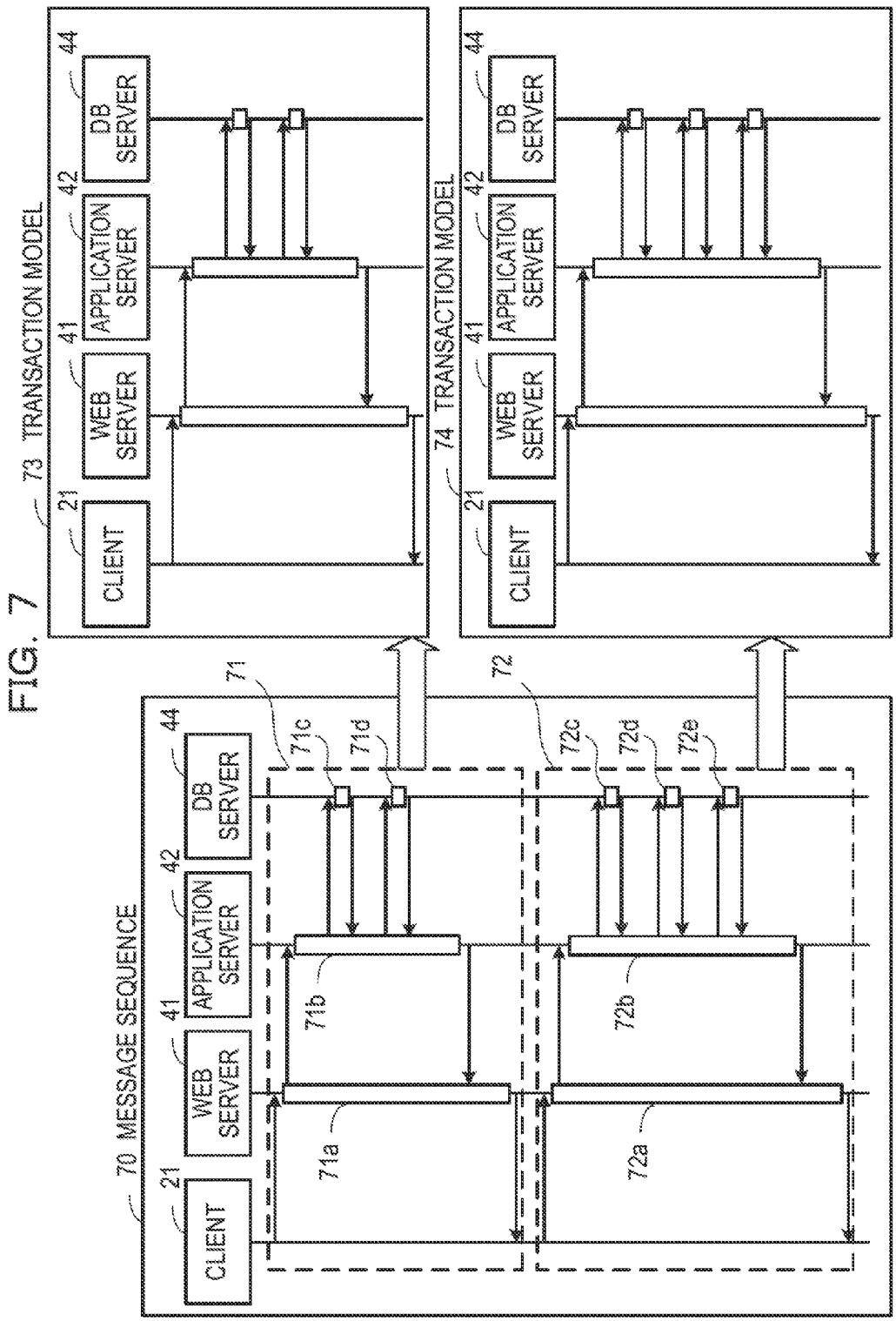
FIG. 7 illustrates an example of transaction models generated when grouping is not performed.

FIG. 7 illustrates an example of transaction models generated when grouping is not performed. The left side of FIG. 7 illustrates an example of a message sequence 70 obtained by analyzing the message data stored in the message storage unit 130. In FIG. 7, arrows pointing to the right indicate request messages, and arrows pointing to the left indicate reply messages.

The Web server 41, the application server 42, and the DB server 44 execute the processing of the message sequence 70 in response to request messages from the client 21. The client 21 issues the processing requests twice.

In a transaction 71 executed in the first processing request, the Web server 41 executes an event 71a in response to the request message from the client 21. The application server 42 executes an event 71b in response to the request message from the Web server 41. The DB server 44 executes events 71c and 71d in response to the second request message from the application server 42.

In a transaction 72 executed on the basis of the second processing request, the Web server 41 executes an event 72a in response to the request message from the client 21. The application server 42 executes an event 72b in response to the request message from the Web server 41. The DB server 44 executes events 72c, 72d, and 72e in response to the third request message from the application server 42.

It is assumed here that, in the transactions 71 and 72, the contents of events executed by the Web server 41 and the application server 42 indicate similar processings. The difference in the numbers of transmissions of request messages from the application server 42 to the DB server 44 is caused simply by the difference in the amounts of data to be accessed.

In such a case, if the model generation processing is performed without performing the grouping on the basis of the message sequence 70, individual models 73 and 74 are generated on the basis of the transactions 71 and 72.

Figure 8:
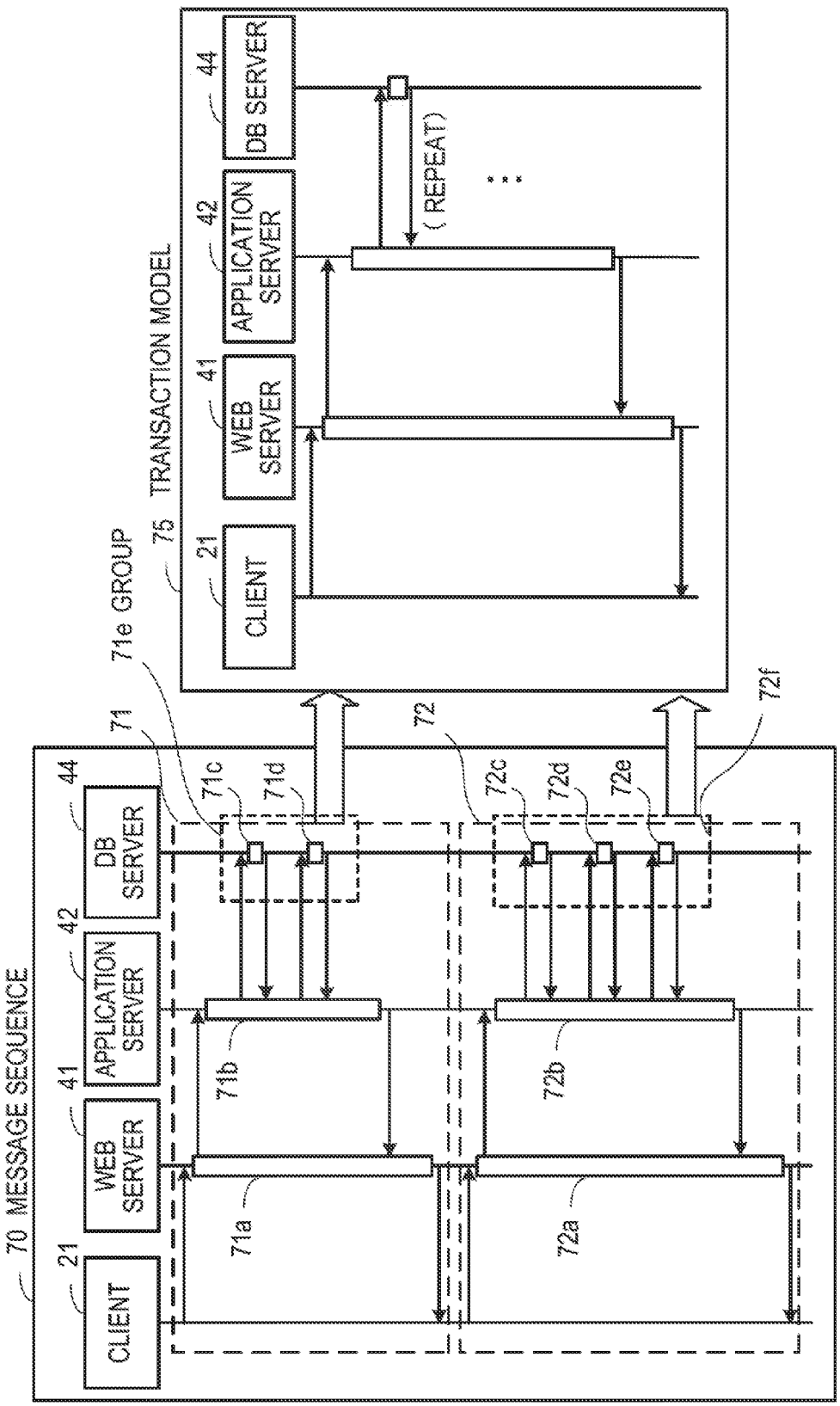
FIG. 8 illustrates an example of a transaction model when grouping is performed.

FIG. 8 illustrates an example of a transaction model generated when grouping is performed. In the example of FIG. 8, the same grouping as in FIG. 7 is performed for the message sequence 70, and then the generation processing of transaction model is executed. In the transaction 71 of the message sequence 70, a group 71e including the events 71c and 71d is generated. In the transaction 72, a group 72f including the events 72c, 72d, and 72e is generated.

If the generation processing of a transaction model is executed after the grouping, two transactions 71 and 72 are integrated as the same type, and a transaction model 75 is generated. For example, the model generating unit 160 detects that the processing in the group 71e and the processing in the group 72f are different only in the numbers of generations of similar events and generates the transaction model 75 that permits a plurality of repetitions of the events.

If such a transaction model 75 is generated, the transactions, in which only the numbers of repetitions of events in the DB server 44 is different during analysis, are analyzed as transactions of the same type.

In this way, the grouping of events generalizes the generated transaction models. However, if the threshold of time intervals is inappropriate, the generalization of the transaction models cannot be performed appropriately. Therefore, it is important to determine an appropriate threshold of time intervals.

Properties desired for appropriate groups are as follows.

[First Property] Events selectable as an invoker exist in all groups.

[Second Property] The number of events selectable as an invoker is small.

[Third Property] The total number of groups is small.

The events selectable as an invoker of a group are events of a server of an invoker (upper layer) executed in the time zone including the time zone in which the group is performed. Including the time zone means that the first event of the group starts after the start time of the events in the upper layer and the last event of the groups ends before the end time of the events of the upper layer. There is a possibility that such a group is invoked from an event of the upper layer.

The first property is desired to generate a transaction model including the group. More specifically, in the grouping of events, events on the basis of request messages repeatedly transmitted to a server of a lower layer are put together in one event of a server of an upper layer. Therefore, it is preferable that the event of the invoker exists in all the generated groups. If there is no event as the invoker of a group, a transaction model including the group cannot be generated, and the grouping becomes meaningless. Therefore, if there is no event as an invoker in a generated group, the group is divided into event-by-event individual groups, the events included in the group.

The second property is desired to increase the accuracy of a generated transaction model. The fact that the number of events selectable as an invoker of a group is large means that there are a multiplicity of patterns of transaction models that are generated using the group. As a result, the possibility that the generated transaction model is inappropriate (another appropriate transaction model exists) increases. Therefore, it is desirable to narrow down the number of events selectable as an invoker as much as possible at the stage of the generation of a group. The second property responds by making the threshold of a time interval as large as possible. Thus, if the threshold of a time interval is large, many events are put together into one group. The time from the start time to the end time is long in a group including many events, and events selectable as invokers of the group are limited.

The third property is desired to reduce the time for generating model. The fact that the number of overall groups is large means that it is likely that events that are to be included in one group belong to individual groups. If events that should be put together into one group belong to different groups, the number of generated transaction models increases, and the effect of reducing the number of transaction models by grouping decreases. If the number of transaction models is reduced, the space searched by the analyzing unit 180 during the analysis of message is reduced, and the processing is more efficient.

The grouping threshold determining unit 140 determines a threshold of time intervals that allows generation of such a group.

Figure 9:
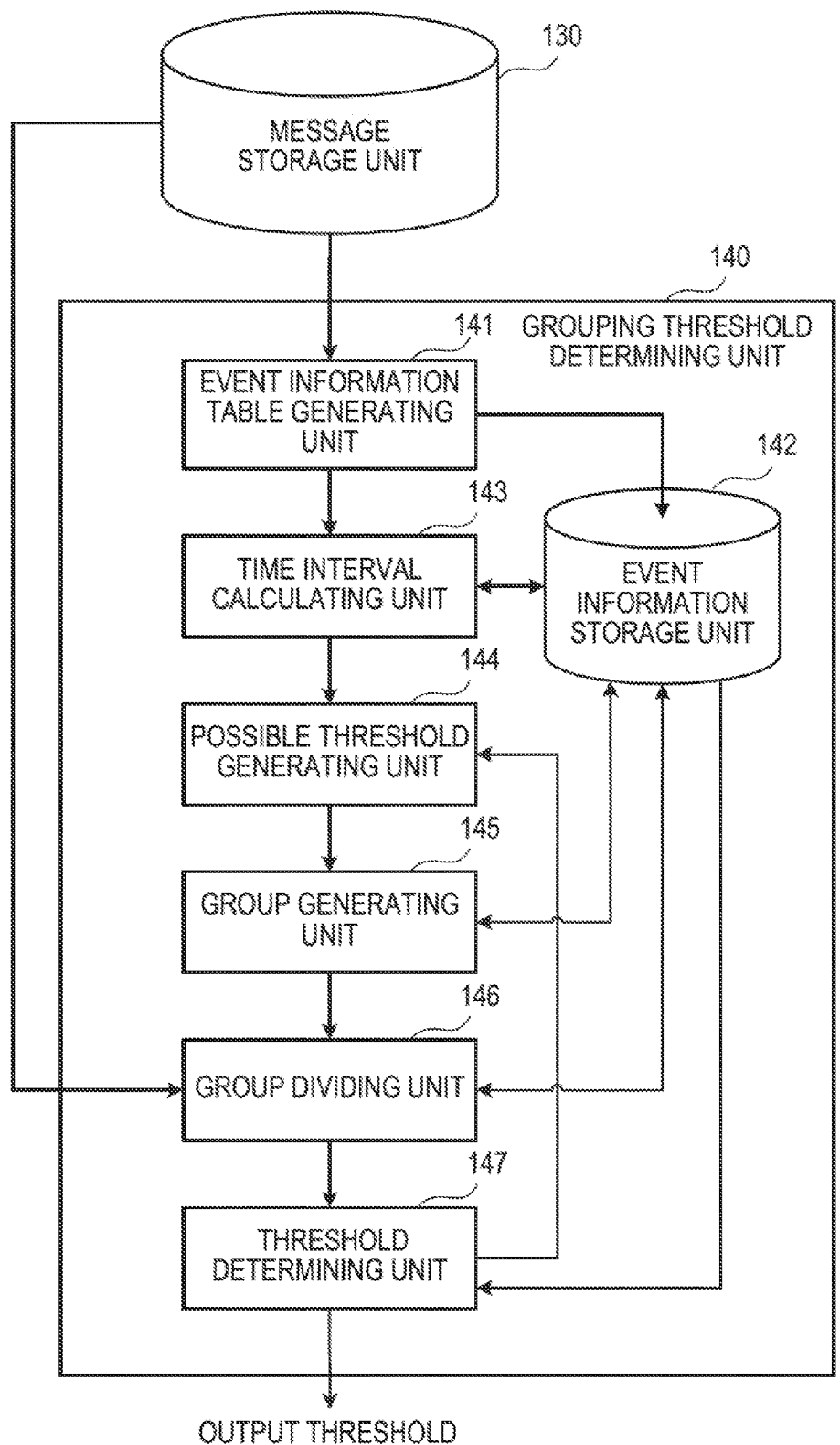
FIG. 9 is a block diagram of an internal function of a grouping threshold determining unit.

FIG. 9 is a block diagram of an internal function of a grouping threshold determining unit. The grouping threshold determining unit 140 includes an event information table generating unit 141, an event information storage unit 142, a time interval calculating unit 143, a possible threshold generating unit 144, a group generating unit 145, a group dividing unit 146, and a threshold determining unit 147.

The event information table generating unit 141 generates an event information table based on message data stored in the message storage unit 130. The event information table is a data table registering the start time and the end time of each event. The event information table generating unit 141 stores the generated event information table in the event information storage unit 142.

The event information storage unit 142 stores the event information table. For example, part of the storage area of the RAM 102 is used as the event information storage unit 142.

The time interval calculating unit 143 refers to the event information table in the event information storage unit 142 and calculates time intervals between events. The time interval calculating unit 143 registers the calculated time intervals in the event information table in the event information storage unit 142.

The possible threshold generating unit 144 generates a value (possible threshold) that is the threshold of time intervals for grouping. When a selected possible threshold is indicated from the threshold determining unit 147, the possible threshold generating unit 144 divides a specific range before and after the possible threshold to again generate possible thresholds. The possible threshold generating unit 144 sends the generated possible thresholds to the group generating unit 145.

The group generating unit 145 refers to the event information table in the event information storage unit 142 and sets the possible threshold received from the possible threshold generating unit 144 as the threshold to group the events to generate groups. The group generating unit 145 registers the generated groups in an event information table 142a in the event information storage unit 142.

Among the generated groups, the group dividing unit 146 divides the groups without events selectable as an invoker into event-by-event groups. The group dividing unit 146 acquires the groups generated by the group generating unit 145 through the event information storage unit 142. The group dividing unit 146 then refers to the message storage unit 130 to search events selectable as an invoker of the groups. The group dividing unit 146 divides the groups without events selectable as an invoker into event-by-event individual groups, the events included in the groups. When the groups are divided, the group dividing unit 146 registers the result in the event information table in the event information storage unit 142.

The threshold determining unit 147 refers to the event information table in the event information storage unit 142 and selects the possible threshold with the least number of groups. The threshold determining unit 147 determines whether an end condition is satisfied and determines the possible threshold selected when the end condition is satisfied as the threshold of time intervals of group generation during the transaction model generation. If the end condition is not satisfied, the threshold determining unit 147 informs the possible threshold generating unit 144 of the selected possible threshold to request generation of the next possible threshold. The end condition is, for example, that an interval between possible thresholds is less than a preset reference value. The threshold determining unit 147 notifies the model generating unit 160 of the ultimately determined threshold.

The procedure of the processing executed by the grouping threshold determining unit 140 will now be described.

Figure 10:
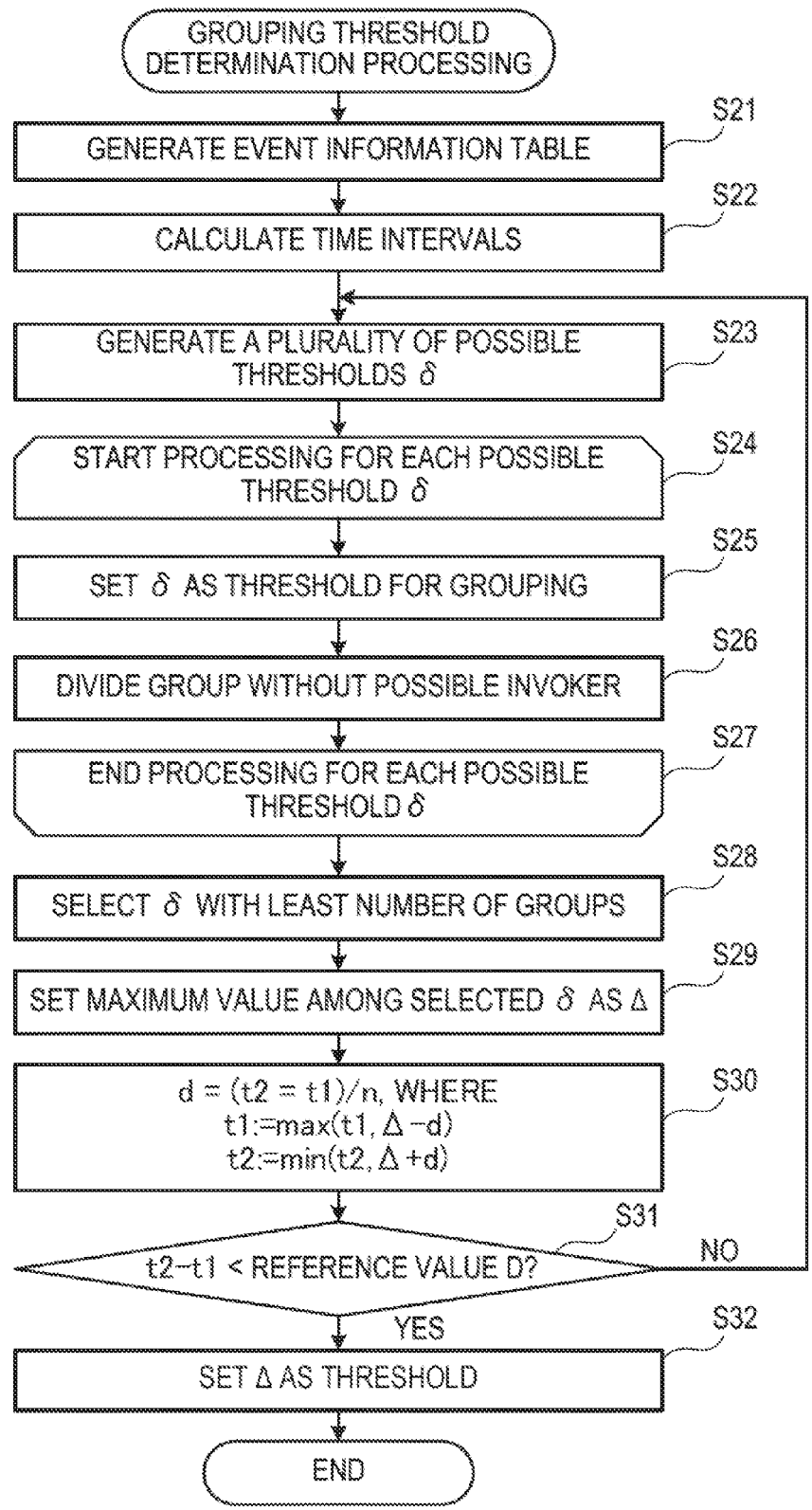
FIG. 10 is a flow chart of a procedure of a grouping threshold determination processing.

FIG. 10 is a flow chart of a procedure of a grouping threshold determination processing. The processing illustrated in FIG. 10 will be described in order of step numbers. It is assumed that an initial value of a search section minimum value t1, an initial value of a search section maximum value t2, a reference value D of section length, and the number of divisions n are set in advance in the grouping threshold determining unit 140. The search section minimum value t1 indicates the minimum value of a section for searching for an appropriate threshold. The search section maximum value t2 indicates the maximum value of a section for searching for an appropriate threshold. The reference value D of section length indicates a section length serving as an end condition for searching for an appropriate threshold. If a section with a length less than the reference value D is the next search section, the grouping threshold determination processing ends.

[Step S21] The event information table generating unit 141 generates an event information table. The event information table generating unit 141 then stores the generated event information table in the event information storage unit 142.

[Step S22] The time interval calculating unit 143 calculates time intervals between consecutive events. The time interval calculating unit 143 then registers the calculated time intervals in the event information table in the event information storage unit 142.

[Step S23] The possible threshold generating unit 144 generates a plurality of possible thresholds δ. The possible threshold generating unit 144 divides the section between the search section minimum value t1 and the search section maximum value t2 by a number of divisions n. The possible threshold generating unit 144 sets the end point of the sections generated by the division as the possible thresholds δ.

[Step S24] The group generating unit 145 starts the processings of steps S25 and S26 for each possible threshold δ.

[Step S25] The group generating unit 145 sets the possible thresholds δ as threshold and groups the events.

[Step S26] The group dividing unit 146 divides the groups without events selectable as possible invokers into event-by-event groups, the events included in the groups.

[Step S27] After checking that the processings of steps S25 and S26 are completed for each possible threshold δ of each end point generated in step S23, the threshold determining unit 147 advances to step S28.

[Step S28] Among the possible thresholds δ generated in step S23, the threshold determining unit 147 selects the possible threshold δ with the least number of groups. If there are a plurality of possible thresholds δ with the least number of groups, the plurality of possible thresholds δ are selected.

[Step S29] The threshold determining unit 147 sets the value of the possible threshold δ with the largest value among the selected possible thresholds δ as a best possible threshold Δ.

[Step S30] The threshold determining unit 147 updates the values of the search section minimum value t1 and the search section maximum value t2. The threshold determining unit 147 calculates a division length d by the following expression.

$$d=(t2-t1)/n \quad (1)$$

Thus, the length of the section after the division in step S23 is the division length d. The threshold determining unit 147 uses the division length d to update the search section minimum value t1 and the search section maximum value t2 by the following expressions.

$$t1=\max(t1, \Delta-d) \quad (2)$$

$$t2=\min(t2, \Delta+d) \quad (3)$$

In expression (2), "max" denotes that the value of the larger one of the variables in parentheses is used. In expression (3), "min" denotes that the value of the smaller one of the variables in parentheses is used.

On the basis of expressions (2) and (3), as for the search section minimum value t1, the value of the larger one of the current search section minimum value t1 and the value of the best possible threshold Δ minus the division length d is set as a new search section minimum value t1. As for the search section maximum value t2, the value of the smaller one of the current search section maximum value t2 and the value of the best possible threshold 4 plus the division length d is set as a new search section maximum value t2. In this way, as the search section minimum value t1 and the search section maximum value t2 are updated, the section twice the length of the division length d centered on the best possible threshold 4 becomes the next search section.

However, if the best possible threshold 4 matches the original search section minimum value t1, the search section minimum value t1 is not changed. In that case, the division length d becomes the section length of the next search section. If the best possible threshold 4 matches the original search section maximum value t2, the search section maximum value t2 is not changed. In that case too, the division length d becomes the section length of the next search section.

[Step S31] The threshold determining unit 147 judges the end conditions. If a value (search section length) obtained by subtracting the search section minimum value t1 from the search section maximum value t2 is smaller than the reference value D of the section length, the threshold determining unit 147 judges that the end condition is satisfied. If the end condition is satisfied, the processing proceeds to step S32. If the end condition is not satisfied, the processing proceeds to step S23.

[Step S32] The threshold determining unit 147 sets the value of the current best possible threshold Δ as the threshold of time intervals and stores the threshold in the threshold storage unit 150. The grouping threshold determination processing then ends.

Steps of the grouping threshold determination processing will now be described in detail. First, the generation processing of the event information table by the event information table generating unit 141 (step S21 of FIG. 10) will be described in detail.

FIG. 11 illustrates a data configuration example of an event information table. The event information table 142a includes fields of event ID, start time, end time, time interval, and possible threshold. In the present embodiment, the grouping processing is executed only for the events generated in the DB server 44 as a lowest-level server. Thus, the event information table generating unit 141 generates the event information table 142a related to the events generated in the DB server 44.

In the field of event ID, identification information of events (event ID) generated in the lowest-level server (DB server 44 in the example of FIG. 2) is set. The event information table generating unit 141 refers to the message data in the message storage unit 130 and recognizes one event on the basis of a pair of a request message and a reply message with a common session number.

Although not illustrated in the example of FIG. 6, whether the message is a request message or a reply message is determined by including IP addresses of the senders and IP addresses of the destinations in the message data. For example, if the sender of message data is the IP address of the application server 42 and the destination is the IP address of the DB server 44, the message data indicates a request message. On the other hand, if the sender of message data is the IP address of the DB server 44 and the destination is the IP address of the application server 42, the message data indicates a reply message.

The event information table generating unit 141 sets event IDs in ascending order from the event with the earliest start time. The event information table generating unit 141 then sets the event IDs of events in the field of event ID so that information of events with smaller event IDs are placed higher.

The start times of corresponding events are set in the field of start time. The start time is an acquisition time of a request message as an event generation factor. FIG. 11 only illustrates values by milliseconds in the time information to simplify the description.

The end times of corresponding events are set in the field of end time. The end time is an acquisition time of a reply message transmitted at the end of the event. FIG. 11 only illustrates values by milliseconds in the time information to simplify the description.

Time differences (time intervals) from the end times of events immediately before to the start times of the corresponding events are set in the field of time interval. The time interval calculating unit 143 sets the values of the time intervals. Therefore, the field of time interval is blank at the time the event information table generating unit 141 generates the event information table 142a.

For each possible threshold generated by the possible threshold generating unit 144, identification codes (group IDs) of groups that the events belong to when the grouping is performed with the possible thresholds are set in the field of possible threshold. The group generating unit 145 sets the possible thresholds and the group IDs. Therefore, the fields of possible threshold and group ID are blank at the time the event information table generating unit 141 generates the event information table 142a.

The time interval calculating unit 143 sets the time intervals on the event information table 142a. A time interval calculation processing (step S22 of FIG. 10) will now be described in detail.

Figure 12:
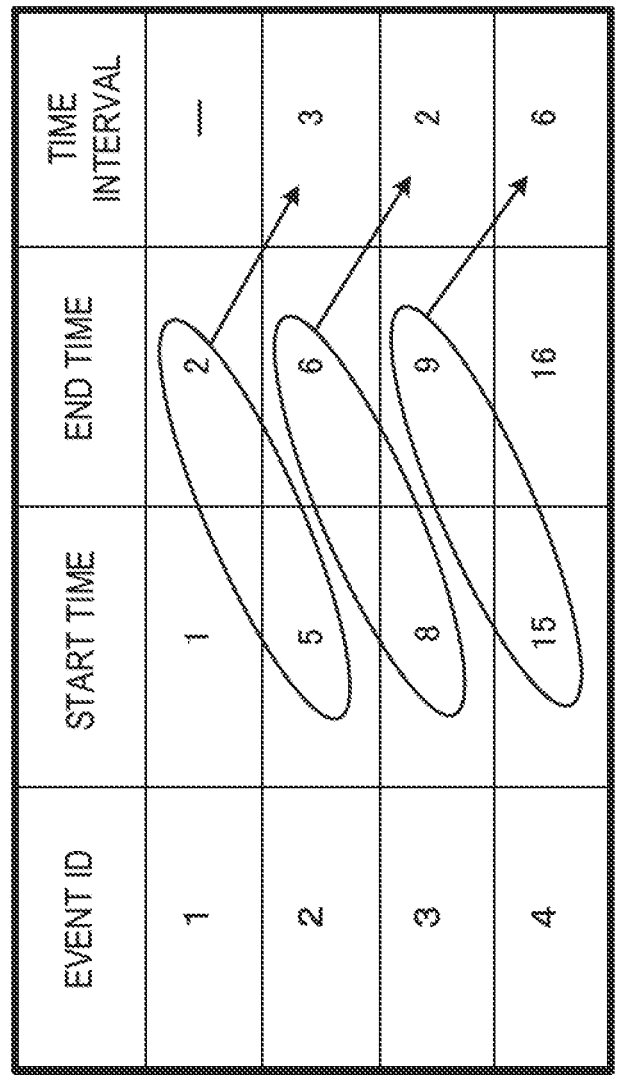
FIG. 12 illustrates a calculation method of time intervals.

FIG. 12 illustrates a calculation method of time intervals. As illustrated in FIG. 12, the time intervals of events are values obtained by subtracting the end times of the events immediately before from the start times of the relevant events. This is expressed by the following formula.

$$\text{Time interval} = \text{start time of event} - \text{end time of event immediately before} \quad (4)$$

The time interval calculating unit 143 calculates the time intervals of the events in the event information table 142a except the event at the top. The time interval calculating unit 143 then sets the calculated values in the field of time interval of the event information table 142a.

FIG. 13 illustrates an event information table after time interval setting. As illustrated in FIG. 13, the time interval calculating unit 143 sets the time interval of each event in the field of time interval of the event information table 142a.

The possible threshold generating unit 144 then generates possible thresholds. The generation processing of possible thresholds (step S23) will now be described in detail.

Figure 14:
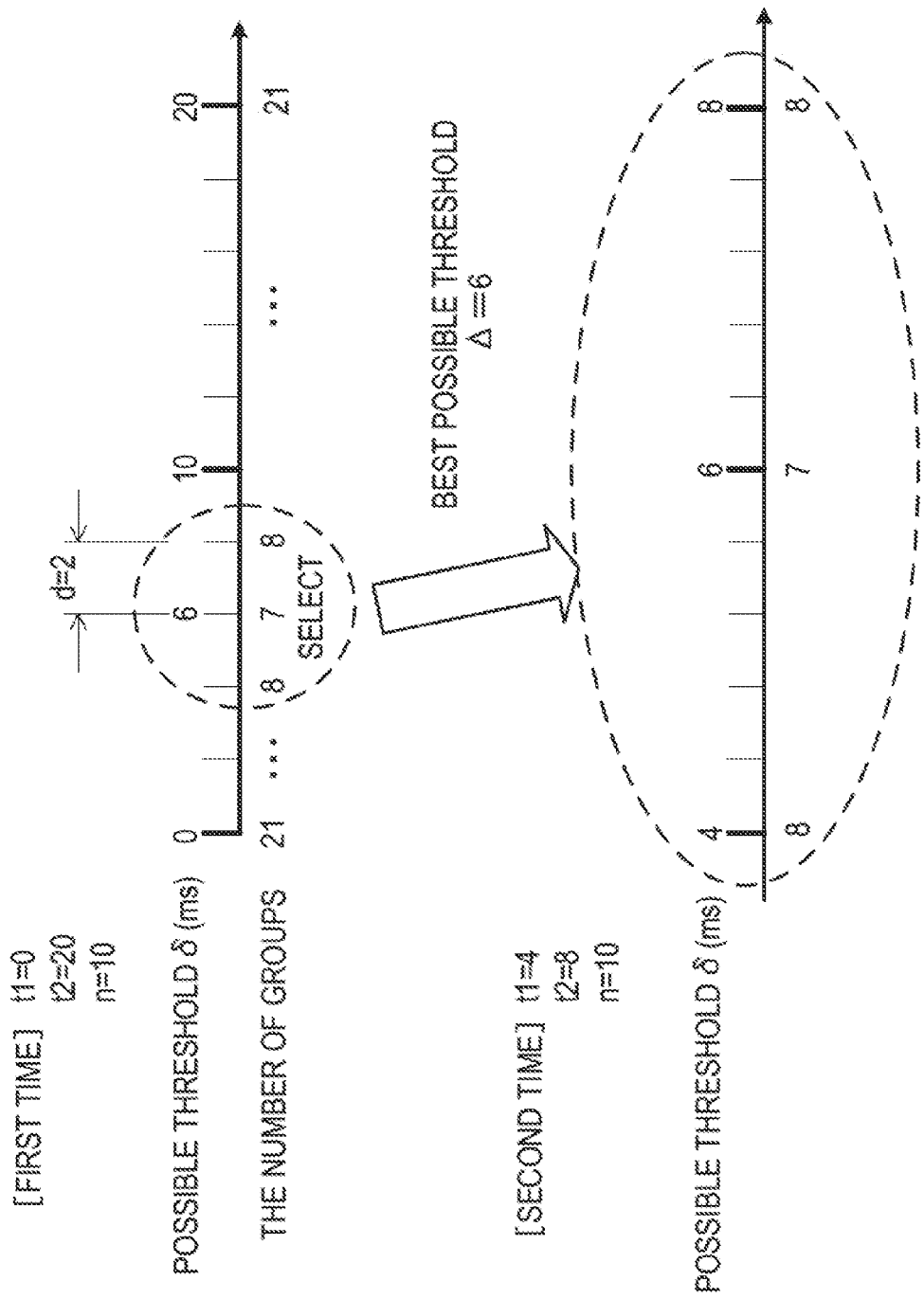
FIG. 14 illustrates an example of possible threshold generation.

FIG. 14 illustrates an example of possible threshold generation. In the example of FIG. 14, it is assumed that the initial value of the search section minimum value t1 is 0 ms, and the initial value of the search section maximum value t2 is 20 ms. It is also assumed that ten is set for the number of division n.

In the first generation processing of possible thresholds δ, the search section from 0 ms to 20 ms is divided into ten. The end points of the divided intervals serve as the possible thresholds δ. As a result, 0 ms, 2 ms, 4 ms, . . . , and 20 ms become the possible thresholds δ. A group is then generated for each possible threshold δ by grouping. The possible threshold δ with the least number of groups is selected and set as the best possible threshold Δ. In the example of FIG. 14, the possible threshold δ of 6 ms is selected and set as the best possible threshold Δ.

The division length d is then calculated. If the search section minimum value t1 is 0 ms, the search section maximum value t2 is 20 ms, and the number of divisions is 10, the division length d is 2 ms (d=(20−0)/10). Therefore, if the best possible threshold Δ is 6 ms, the search section minimum value t1 is 4 (t1=6−2). The search section maximum value t2 is 8 (t2=6+2).

Consequently, in the second generation processing of possible thresholds δ, the section from 4 ms to 8 ms is divided into ten. As a result, 4 ms, 4.4 ms, 4.8 ms, . . . , and 8 ms become the possible thresholds δ. Among these, the possible thresholds δ of 4 ms, 6 ms, and 8 ms are already grouped in the first processing. Therefore, the possible thresholds δ other than 4 ms, 6 ms, and 8 ms are grouped in the second grouping processing. In this way, the search section is gradually narrowed down, and the partition length of possible threshold generation is also narrowed down.

When the possible thresholds δ are generated, the group generation processing is executed for each possible threshold δ. The group generation processing (step S25 of FIG. 10) will now be described in detail.

FIG. 15 illustrates a group generation example with a possible threshold "5 ms". The group generating unit 145 refers to the event information table 142a to compare the values of the time interval and the possible threshold of each event. If the time interval of event is equal to or smaller than the possible threshold, the group generating unit 145 puts the event into the same group as the event immediately before. On the other hand, if the time interval of event exceeds the possible threshold, the group generating unit 145 sets the event in a group which is different from the event immediately before.

In the example of FIG. 15, the time interval of the event with event ID "2" is "3 ms". Since the time interval is smaller than the possible threshold "5 ms", the event with event ID "2" is put together into the same group as the event with event ID "1". The time interval of the event with event ID "4" is "6 ms". Since the time interval is greater than the possible threshold "5 ms", the event with event ID "4" is set in a group different from the event with event ID "3", The group generating unit 145 provides a group ID to each of the groups generated this way. The group generating unit 145 then sets a value "5 ms" of possible threshold to the field of the possible threshold of the event information table 142a. The group generating unit 145 further sets group IDs of the groups, to which the events belong, in the field of group ID below the possible threshold, with which the groups are generated.

The group generating unit 145 further generates a group information table 142b related to the generated groups. Possible thresholds when the groups are generated are set in the group information table 142b. The group information table 142b also includes fields of group ID, start time, and end time.

Group IDs of the generated groups are set in the field of group ID. Start times of the generated groups are set in the field of start time. The start time of a group is the start time of the event with the smallest event ID included in the group (first event in the group). End times of the generated groups are set in the field of end time. The end time of a group is the end time of the event with the largest event ID included in the group (last event in the group).

The group generating unit 145 stores the generated group information table 142b in the event information storage unit 142.

FIG. 16 illustrates a group generation example with a possible threshold "2 ms". When groups are generated with the possible threshold "2 ms", more groups than groups with the possible threshold "5 ms" are generated. For example, the time interval of the event with event ID "2" is "3 ms". Since the time interval is greater than the possible threshold "2 ms", the event with event ID "2" is set in a group different from the event with event ID "1".

The group generating unit 145 generates a group information table 142c of the groups generated with the possible threshold "2 ms" and stores the table in the event information storage unit 142.

When the group generation processing is executed, the smaller the value of the possible threshold δ is, the larger the number of groups. When groups are generated, the group dividing unit 146 executes a group division processing (step S26). The group division processing will now be described in detail.

Figure 17:
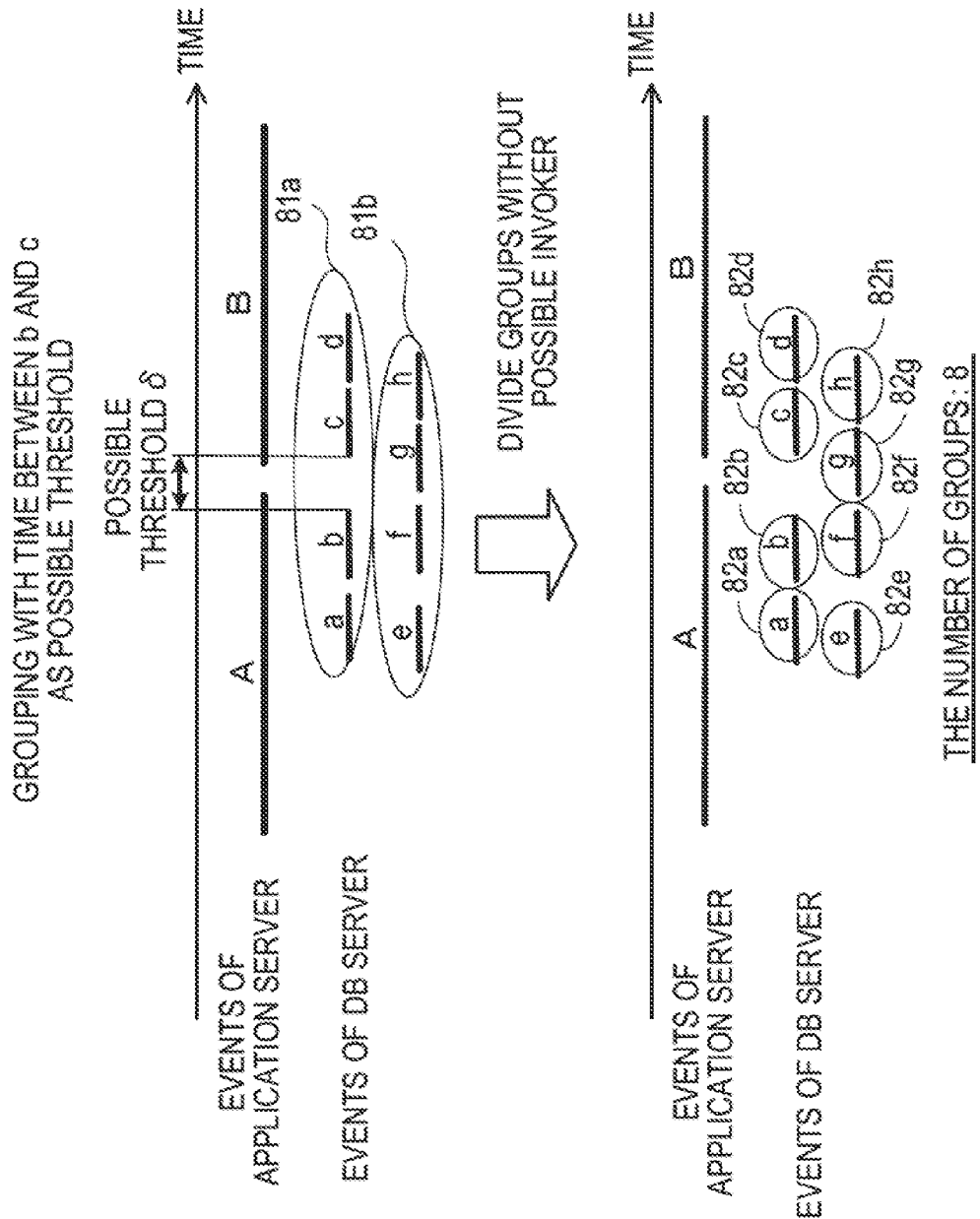
FIG. 17 illustrates a first example of a group division processing.

FIG. 17 illustrates a first example of the group division processing. In the example of FIG. 17, it is assumed that while two events A and B of the application server 42 are executed, four events a, b, c, and d of the DB server 44 and four events e, f, g, and h of the DB server 45 are executed. The grouping of events is executed only between the events executed in the same DB server. For example, the events b and e will not be in the same group.

With such an event sequence, it is assumed that the time interval between the events b and c is set as the possible threshold δ, and the group generation processing is executed. The time intervals between the consecutive events a, b, c, and d are equal to or smaller than the possible threshold. Therefore, a group 81b that the events e, f, g, and h belong to and a group 81a that the events a, b, c, and d belong to are eventually generated.

The group dividing unit 146 determines whether there is at least one event of the application server 42 selectable as an invoker in the generated groups 81a and 81b. The condition for the events A and B of the application server 42 to be an invoker of the groups 81a and 81b, in which the events of the DB servers 44 and 45 are put together, is that time zones of the group 81a and 81b are included in the processing time zone of the events A and B. Therefore, it is recognized that there is no event selectable as an invoker in the groups 81a and 81b.

The group dividing unit 146 divides the groups 81a and 81b without possible invokers into event-by-event individual groups. Therefore, the group 81a is divided into four groups 82a, 82b, 82c, and 82d. Similarly, the group 81b is divided into four groups 82e, 82f, 82g, and 82h. As a result, the number of groups is "8".

FIG. 18 illustrates a second example of the group division processing. In the example of FIG. 18, the event sequence is similar to that in the example of FIG. 17. However, the possible threshold δ in the group generation processing is slightly shorter than the time interval between the events e and f. Compared to the example of FIG. 17, the time interval between the events e and f is greater than the possible threshold δ in this case. The time interval between the events b and c is also greater than the possible threshold δ.

As a result, the group generation processing generates a group 83a that the events a and b belong to, a group 83b that the events c and d belong to, a group 83c that the event e belongs to, and a group 83d that the events f, g, and h belong to.

The group dividing unit 146 determines whether there is at least one event of the application server 42 selectable as an invoker in the generated groups 83a, 83b, 83c, and 83d. It is recognized that there is no event selectable as an invoker in the group 83d.

The group dividing unit 146 divides the group 83d without a possible invoker into event-by-event individual groups. The group 83d is divided into three groups 84a, 84b, and 84c. As a result, the number of groups is "6".

As illustrated in FIGS. 17 and 18, if the possible threshold is too large as a result of the generation division processing, groups without an event of an invoker are generated. In that case, the groups are divided into event-by-event groups. Dividing the groups into event-by-event groups minimize the number of events belonging to groups without an invoker.

Although the number of groups generated by the group generation processing is small when the possible threshold is too large, the execution of the group division processing makes the ultimate number of groups large. Therefore, if the value is too large, the possible threshold is not selected in the processing of step S28. On the other hand, if the possible threshold is too small, the number of groups generated by the group generation processing is large from the beginning. Thus, the possible threshold with too small a value is not selected in the processing of step S28. Therefore, an appropriate threshold is be determined by selecting a possible threshold with small number of groups generated by grouping groups as a best possible threshold and repeating the detailed search before and after the best possible threshold.

If an appropriate threshold of time interval is used to execute the model generation processing accompanied by grouping, an appropriate transaction model is generated.

Figure 19:
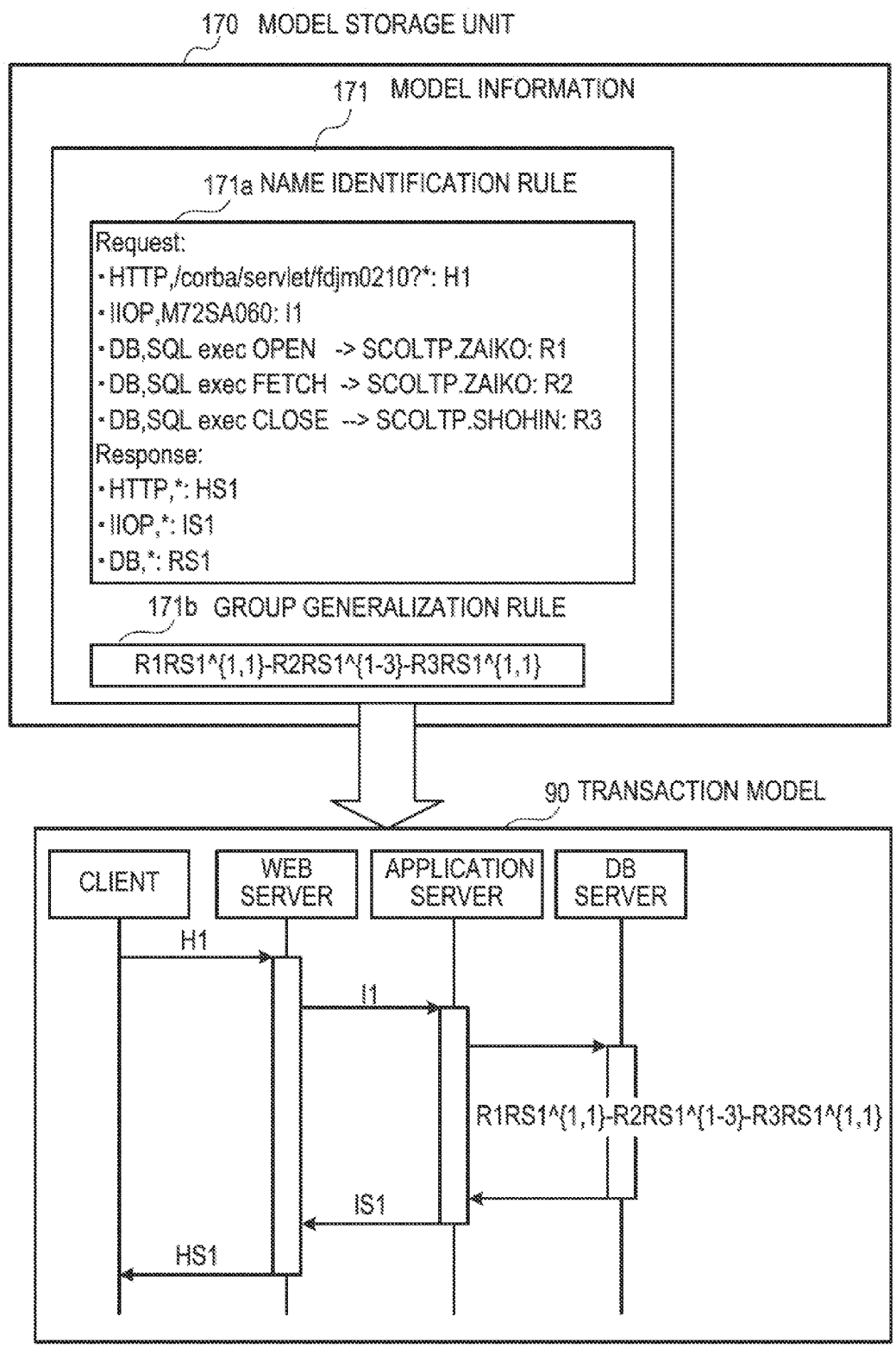
FIG. 19 illustrates an example of a transaction model including groups.

FIG. 19 illustrates an example of a transaction model including groups. The model storage unit 170 stores model information 171 indicating a generated transaction model 90. The model information 171 including groups includes a name identification rule 171a and a group generalization rule 171b.

The name identification rule 171a indicates the contents of messages defined in a transaction model 90. In the example of FIG. 19, request messages include an HTTP request message from the client to the Web server and an IIOP (Internet Inter-ORB Protocol) message from the Web server to the application server. Request messages from the application server to the DB server include messages requesting "OPEN", "FETCH", and "CLOSE" of the database. Reply messages corresponding to the request messages are also defined.

The group generalization rule 171b defines a rule for determining whether an event is included in a group. The definition in the example of FIG. 19 is as follows.

R1RS1^{1,1}-R2RS1^{1-3}-R3RS1^{1,1}

R1 denotes an event of an "OPEN" processing of the database. R2 denotes an event of a "FETCH" processing of the database. R3 denotes an event of a "CLOSE" processing of the database. RS1 denotes a reply message from the DB server. The symbol "-" denotes a segmentation of events. Events defined on the left side of the group generalization rule 171b are executed first.

"R1RS1^{1,1}" denotes that one or more and one or less event indicated by "R1" and "RS1" is included.

"R2RS1^{1-3}" denotes that one or more and three or less events indicated by "R2" and "RS1" are included.

"R3RS1^{1,1}" denotes that one or more and one or less event indicated by "R3" and "RS1" is included.

In this way, a transaction model with generalized groups is generated by using an appropriate threshold for grouping. Furthermore, using an appropriate threshold prevents the accidental inclusion of unrelated events in the same group. Using an appropriate threshold also appropriately puts together a plurality of events invoked from similar events into one group. As a result, the number of generated transaction models is reduced. If the number of transaction models is small, the comparison processing load of the generated transaction and the transaction model is reduced upon the analysis of the transaction during service operation.

In the present embodiment, the minimum value and the maximum value of the time intervals of processings are set as the initial value of the search section, and the search section is gradually narrowed down until the length of the search section is below a reference value. As the length of the search section becomes small, possible thresholds are generated at small intervals. This reduces the number of possible thresholds generated until the determination of an optimal threshold, and reduces the processing load until the determination of the threshold is reduced.

If all events include invokers, the maximum threshold including the invokers is calculated in all groups. However, events of applications of invokers are not observed in the actual system in some cases. In the examples of FIGS. 17 and 18, there is no event of invoker in the event g even if a group is made up of only by the event g. Examples of the reasons that events without invokers are detected are as follows.

The first reason is missed packets on the network. A large amount of packets on the network cause the observation of messages to fall behind. If the packets related to an event of an invoker are missing, the event is not detected, and only the event of the call target is detected. In that case, even when searching for the event of the invoker corresponding to the event of the call target, the event cannot be found.

The second cause is the existence of an event generated by internal processings (processings not based on a request from the Web server 41) of the application servers 42 and 43. The application servers 42 and 43 use internal management functions to output request messages to the DB servers 44 and 45 in some cases. In that case, there is no event of invoker as in the event g.

If there is an event without event of invoker (hereinafter, "invoker missing event"), a threshold that provides groups, in which invokers are included in as many groups as possible and the total number of groups is small, is set as an appropriate threshold. Even if the invoker missing events are put together with other events by the group generation processing, the invoker missing events are always divided into event-by-event individual groups by the group division processing. As a result, regardless of the value of the possible threshold, the invoker missing events form groups including only the events. As a result, in the comparison of the numbers of groups generated for each possible threshold, the existence of the invoker missing event does not significantly affect the selection of the best possible threshold.

Therefore, according to the present embodiment, an optimal threshold is obtained by a unified method regardless of the existence of the invoker missing event.

It has been assumed in the examples of FIGS. 17 and 18 that the DB server 44 executes the events a, b, c, and d, and the DB server 45 executes the events e, f, g, and h. Therefore, it is easily determined that the events a, b, c, and d and the events e, f, g, and h do not constitute the same groups as each other. However, if a message sequence is generated from a system that is actually in operation, a plurality of events such as the events a and e, in which the processing time zones overlap, are generated even in a processing within one DB server (for example, DB server 44). In such a case, events with overlapped processing times are not included in the same groups in the group generation processing.

For example, in the event sequence illustrated in FIG. 17, groups are generated with the following procedure. It is assumed that the possible threshold δ is equal to the time interval between the events b and c.

The group generating unit 145 determines the groups in order from the event with the earliest start time. In that case, the group 81*b* is first generated by the event e. The processing time of the next event a overlaps with the event e. Thus, the group generating unit 145 generates the second group 81*a* that the event a belongs to. The time interval between the next event b and the event a is equal to or smaller than the possible threshold δ. Therefore, the group generating unit 145 puts the event b together with the same group 81*a* as the event a.

The processing time of the next event f overlaps with the event b. Thus, the group generating unit 145 excludes the group 81*a* including the event b from the determination target in the grouping of the event f. Consequently, the group 81*b* becomes the determination target in the grouping of the event f. Thus, the time interval calculating unit 143 updates the time interval of the event f, which is set in the event information storage unit 142, to the time interval with the event e. The time interval between the events e and f is equal to or smaller than the possible threshold δ. Therefore, the event f is put together in the group 81*b* that the event e belongs to. Subsequently, the groups that the other events c, d, g, and f belong to are also determined. As a result, two groups 81*a* and 81*b* as in FIG. 17 are generated.

In this way, not including the events with overlapped processing times in the same group allows determination of an appropriate threshold on the basis of a complicated message sequence generated during the system operation.

In the embodiment, if there are a plurality of possible thresholds with the least number of groups, a possible threshold with larger value is determined as the threshold. In this way, if appropriate grouping is possible with any of the possible thresholds within a certain range, the largest possible threshold in the range is determined as the threshold. The larger the value of the threshold is, the smaller the number of groups generated in the group generation processing (groups to be determined in the division processing). Since the searching processing of an event as an invoker is desired in the group division processing, the fewer the groups to be determined in the division processing are, the more the load in the group division processing is reduced. Thus, Setting the possible largest threshold makes the processing more efficient.

Moreover, the larger the threshold is, the more events are put together in one group upon the transaction model generation. Consequently, the time from the start time to the end time of a group becomes long, and events selectable as an invoker are limited. As a result, the possibility of erroneous selection of an invoker event of a group is reduced, and the accuracy of the transaction model increases.

In the embodiment, the maximum value and the minimum value of the search section of threshold are designated as the initial value. In this way, the search section does not have to be an unnecessarily wide range, and the processing is more efficient.

In the embodiment, the search section is divided by a specific number, and the time intervals as end points of the sections obtained by the division serve as possible thresholds. In this way, the generation of possible thresholds at equal intervals in the search section prevents the occurrence of a skipped search.

In the embodiment, the possible threshold with the least number of groups among the already generated possible thresholds is selected as the best possible threshold until a specific search ending condition is satisfied. A specific range before and after the best possible threshold is set as the search section, and the possible thresholds are again generated. In this way, gradually narrowing down the search section prevents the generation of unnecessary possible thresholds. If the number of generated possible thresholds decreases, the processing load also decreases accordingly.

In the embodiment, when the best possible threshold is inputted, the search section at the time the possible threshold immediately before is generated is divided by a specific number. The range of values obtained by adding and subtracting the division result to and from the best possible threshold is set as a new search section, and possible thresholds are generated. As a result, the range centered on the best possible threshold is set as the next search section. In this way, the search range is appropriately narrowed down.

In the embodiment, the processings executed by the servers are determined from the pairs of the request message and the reply message on the basis of the messages in the message storage unit 130. Furthermore, the acquisition time of the request message is set as the start time of the processing, and the acquisition time of the reply message is set as the end time of the processing. The start time and the end time are stored in the event information storage unit 142. In this way, the event information table 142a is automatically generated on the basis of the messages transmitted over the network.

In the embodiment, messages transmitted and received between a plurality of servers are acquired from a network connected with a plurality of servers that provide services. The acquisition times are then attached to the acquired messages, and the messages are stored in the message storage unit 130. In this way, a practical threshold is determined on the basis of the message observation result of a Web 3-layer system in actual operation.

In the embodiment, an automatically determined threshold is used to put together consecutive processings executed at time intervals equal to or smaller than the threshold into one group, and the transaction model is generated. In this way, the determination of threshold and the generation of a transaction model are executed in a series of processings. Upon the generation of the transaction model, an appropriate threshold for grouping is determined on the basis of the message data from which the transaction model is generated. As a result, even if appropriate thresholds differ depending on the conditions of the system operation, an appropriate threshold is used each time to generate the transaction model.

The processing functions described above are realized by a computer. In that case, a program describing the processings of functions that are included in the service processing status analyzing apparatus 100 is provided. The computer executes the program to realize the processing functions on the computer. The program describing the processings is recorded in a computer-readable recording medium. Examples of the computer-readable recording medium include a magnetic storage device, an optical disk, a magneto-optical recording medium, and a semiconductor memory. Examples of the magnetic storage device include a hard disk drive (HDD), a flexible disk (FD), and a magnetic tape. Examples of the optical disk include a DVD, a DVD-RAM, a CD-ROM, and a CD-R/RW. An example of the magneto-optical recording medium includes an MO.

In summary, an appropriate threshold of time intervals for grouping is automatically determined.

To distribute the program, for example, a portable recording medium, such as a DVD and a CD-ROM, recording the program is sold. The program may be stored in a storage device of a server computer, and the program may be transferred from the server computer to another computer through the network.

The computer that executes the program stores, for example, a program recorded in a portable recording medium or a program transferred from the server computer in the storage device of the computer. The computer then reads out the program from the storage device of the computer and executes processings according to the program. The computer may directly read out the program from a portable recording medium to execute the processings according to the program. The computer may also sequentially execute processings according to a received program every time a program is transferred from the server computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

The invention claimed is:

1. A non-transitory computer-readable recording medium encoded with a transaction model generation support program including instructions executable on a processor, the processor executing a model generation support processing of transactions in which services are processed in multiple layers, the program causing the processor to execute:
   a time interval calculation procedure of referring to a first memory that stores start times and end times of processings, which are invoked and generated from another processing in the services, of a server to calculate time intervals between the processings;
   a possible threshold generation procedure of generating a plurality of possible thresholds that are possible criteria for grouping the processings according to the time intervals between the processings and any of events selectable as an invoker existing in all groups, a number of events selectable as the invoker, and a total number of groups;
   a group generation procedure of putting together, for each of the generated possible thresholds, consecutive processings of the processings, in which the time intervals between the consecutive processings are equal to or smaller than a possible threshold, into a same group to generate a group that the respective consecutive processings belong to;
   a group division procedure of dividing a group, among the generated groups, without the another processing serving as an invoker into processing-by-processing groups; and
   a threshold determination procedure of determining the possible threshold with the least number of groups as a determined threshold.

2. The non-transitory computer-readable recording medium according to claim 1, wherein the threshold determination procedure determines the possible threshold with a larger value as the determined threshold if there are a plurality of possible thresholds with the least number of groups.

3. The non-transitory computer-readable recording medium according to claim 1, wherein, in the possible threshold generation procedure, a search section of the determined threshold is designated in advance, and the possible thresholds in the search section are generated.

4. The non-transitory computer-readable recording medium according to claim 3, wherein the possible threshold generation procedure divides the search section by a specific number and sets time intervals as end points of the sections obtained by the division of the search section as the possible thresholds.

5. A non-transitory computer-readable recording medium encoded with a transaction model generation support program including instructions executable on a processor, the processor executing a model generation support processing of transactions in which services are processed in multiple layers, the program causing the processor to execute:
   a time interval calculation procedure of referring to a first memory that stores start times and end times of processings occurring before any network transmitting procedure, which are invoked and generated from another processing in the services, of a server to calculate time intervals between the processings;

a possible threshold generation procedure of generating a plurality of possible thresholds that are possible criteria for grouping the processings according to the time intervals between the processings;

a group generation procedure of putting together, for each of the generated possible thresholds, consecutive processings of the processings, in which the time intervals between the consecutive processings are equal to or smaller than a possible threshold, into a same group to generate a group that the respective consecutive processings belong to;

a group division procedure of dividing a group, among the generated groups, without the another processing serving as an invoker into processing-by-processing groups; and a threshold determination procedure of determining the possible threshold with the least number of groups as a determined threshold, in the possible threshold generation procedure, a search section of the determined threshold is designated in advance, and the possible thresholds in the search section are generated, and when a best possible threshold is inputted, the possible threshold generation procedure sets a specific range centered on the best possible threshold as the search section to again generate the possible thresholds, and the threshold determination procedure selects the possible threshold with the least number of groups among the already generated possible thresholds as the best possible threshold and outputs the best possible threshold until a specific search ending condition is satisfied.

6. The non-transitory computer-readable recording medium according to claim 5, wherein, when the best possible threshold is inputted, the possible threshold generation procedure divides the search section at the time the possible threshold is generated immediately before the input by a specific number and sets a range of a value obtained by adding and subtracting the division result to and from the best possible threshold as a new search section to generate the possible thresholds.

7. The non-transitory computer-readable recording medium according to claim 1, the program further causing the processor to execute:

a processing time setting procedure of referring to a second memory that stores messages transferred between a plurality of servers that execute processings of each layer of the services and acquisition times of the messages, determining processings executed by the servers based on pairs of a request message and a reply message, setting the acquisition times of the request messages as the start times of the processings, setting the acquisition times of the reply messages as the end times of the processings, and storing the start times and the end times of the processings in the first memory.

8. The non-transitory computer-readable recording medium according to claim 7, the program further causing the processor to execute:

a message observation procedure of acquiring messages transmitted and received to and from the plurality of servers from a network connected with the plurality of servers that provides the services, attaching the acquisition times to the acquired messages, and storing the messages in the message storage unit.

9. The non-transitory computer-readable recording medium according to claim 1, the program further causing the processor to execute:

the transaction model generation procedure of putting together consecutive processings executed at time intervals equal to or smaller than the determined threshold into one group to generate a transaction model.

10. A computer that supports generating a model of transactions in which services are processed in multiple layers, the computer comprising:

a first memory; and a processor to execute an operation including: referring to a the first memory that stores start times and end times of processings, which are invoked and generated from another processing in the services, of a server to calculate time intervals between the processings;

generating a plurality of possible thresholds that are possible criteria for grouping the processings according to the time intervals between the processings and any of events selectable as an invoker existing in all groups, a number of events selectable as the invoker, and a total number of groups;

putting together, for each of the generated possible thresholds, consecutive processings of the processings, in which the time intervals between the consecutive processings are equal to or smaller than a possible threshold, into the same group to generate a group that the dividing a group, among the generated groups, without the another processing serving as an invoker into processing-by-processing groups; and determining the possible threshold with the least number of groups as the determined threshold.

11. A transaction model generation support method for a computer to execute a model generation support processing of transactions in which services are processed in multiple layers, the method comprising:

referring to a first memory that stores start times and end times of processings, which are invoked and generated from another processing in the services, of the same server to calculate time intervals between the processings;

generating a plurality of possible thresholds that are possible criteria for grouping the processings according to the time intervals between the processings and any of events selectable as an invoker existing in all groups, a number of events selectable as the invoker, and a total number of groups;

putting together, for each of the generated possible thresholds, consecutive processings of the processings, in which the time intervals between the consecutive processings are equal to or smaller than a possible threshold, into the same group to generate a group that the consecutive processings belong to;

dividing a group, among the generated groups, without the another processing serving as an invoker into processing-by-processing groups; and determining the possible threshold with the least number of groups as the determined threshold.

12. The method according to claim 11, wherein the determining determines the possible threshold with a larger value as the determined threshold if there are a plurality of possible thresholds with the least number of groups.

13. The method according to claim 11, wherein, in the generating, a search section of the determined threshold is designated in advance, and the possible thresholds in the search section are generated.

14. The method according to claim 13, wherein the generating divides the search section by a specific number and sets time intervals as end points of the sections obtained by the division of the search section as the possible thresholds.

* * * * *